United States Patent
Ishii et al.

(10) Patent No.: US 7,798,723 B2
(45) Date of Patent: Sep. 21, 2010

(54) ROLLING BEARING ASSEMBLY FOR WHEEL

(75) Inventors: Yasuhiko Ishii, Kashiwara (JP); Naoki Morimura, Kashiba (JP); Tetsuaki Numata, Nara (JP); Nobutsuna Motohashi, Katsuragi (JP); Hirochika Ueyama, Hirakata (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 572 days.

(21) Appl. No.: 11/822,052

(22) Filed: Jul. 2, 2007

(65) Prior Publication Data
US 2008/0013873 A1 Jan. 17, 2008

(30) Foreign Application Priority Data
Jun. 30, 2006 (JP) .......................... P2006-181956
Jul. 10, 2006 (JP) .......................... P2006-188812

(51) Int. Cl.
*F16C 19/08* (2006.01)
*G01P 3/48* (2006.01)
*G01B 7/14* (2006.01)

(52) U.S. Cl. .................. 384/448; 384/537; 324/173; 324/207.25

(58) Field of Classification Search ......... 384/445–448, 384/477, 484, 537, 541; 324/173–174, 207.25; 277/345
See application file for complete search history.

(56) References Cited

U.S. PATENT DOCUMENTS

| | | | | |
|---|---|---|---|---|
| 5,388,916 A | * | 2/1995 | Ohtsuki et al. .............. | 384/448 |
| 5,470,157 A | * | 11/1995 | Dougherty et al. .......... | 384/448 |
| 5,527,114 A | * | 6/1996 | Morita .................. | 324/207.25 |
| 5,898,388 A | * | 4/1999 | Hofmann et al. ............ | 384/446 |
| 6,045,267 A | * | 4/2000 | Merklein et al. ............ | 384/448 |
| 6,231,241 B1 | * | 5/2001 | Ohkuma ....................... | 324/173 |
| 6,559,633 B1 | * | 5/2003 | Nachtigal et al. ........... | 324/174 |
| 6,585,420 B2 | * | 7/2003 | Okada et al. ................ | 384/448 |
| 6,695,484 B2 | * | 2/2004 | Vignotto et al. ............. | 384/448 |
| 7,431,509 B2 | * | 10/2008 | Takada ....................... | 384/448 |
| 2005/0031239 A1 | * | 2/2005 | Aoki et al. .................. | 384/448 |

FOREIGN PATENT DOCUMENTS

| | | | | |
|---|---|---|---|---|
| DE | 19537039 A1 | * | 4/1997 | |
| EP | 516973 A1 | * | 12/1992 | |
| GB | 2207470 A | * | 2/1989 | |
| JP | 03120473 A | * | 5/1991 | |
| JP | 2002-340922 | | 11/2002 | |
| JP | 2005-17076 | | 1/2005 | |
| JP | 2005256880 A | * | 9/2005 | |

* cited by examiner

*Primary Examiner*—Marcus Charles
(74) *Attorney, Agent, or Firm*—McGinn IP Law Group, PLLC

(57) ABSTRACT

A rolling bearing assembly for a wheel includes a cylindrical fixed bearing ring fixed to a vehicle body side, a rotary bearing ring rotatably inserted to inside of the fixed bearing ring, and plural rows of rolling elements rollably arranged between the bearing rings. An annular sensor housing is attached to an inboard side end portion of the fixed bearing ring and includes a plurality of displacement sensors for detecting gaps between the displacement sensors and outer peripheral surfaces of inboard side end portions of the rotary bearing ring in a circumferential direction. Further, an inboard side end portion of the sensor housing is sealed by an inner side seal device.

4 Claims, 20 Drawing Sheets

FIG. 14A
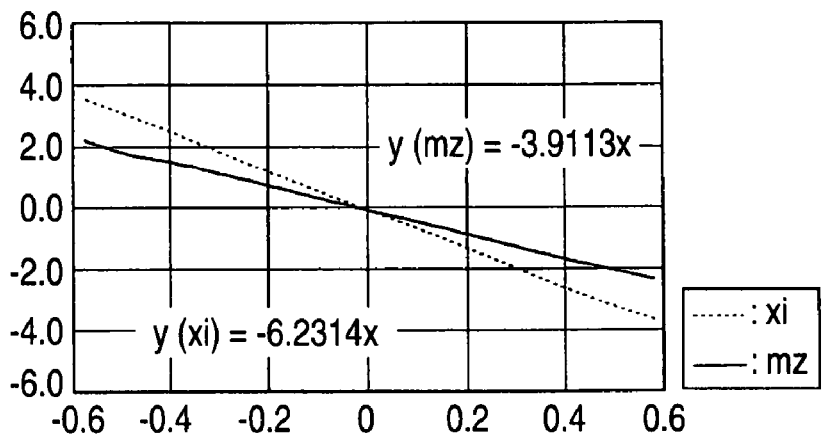
FIG. 14B
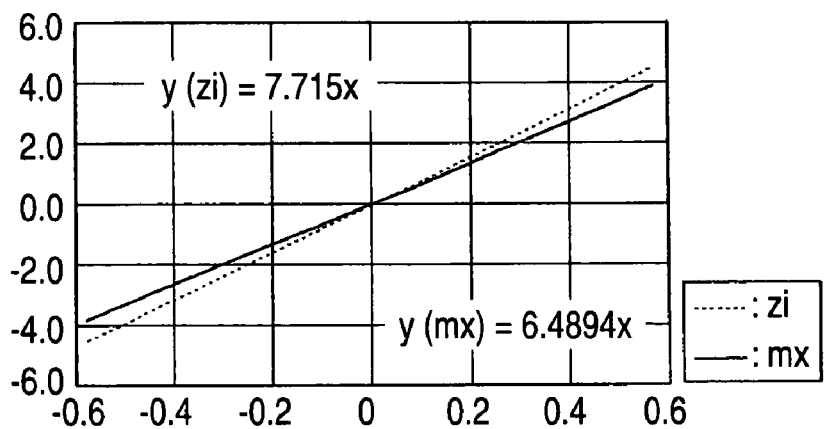
FIG. 14C
$$\begin{pmatrix} kz = y(xi) / y(mz) \\ kx = y(zi) / y(mx) \end{pmatrix}$$

ROLLING BEARING ASSEMBLY FOR WHEEL

BACKGROUND

The present invention relates to a rolling bearing assembly for a wheel. Farther in details, the invention relates to a rolling bearing assembly for a wheel used in a vehicle of an automobile or the like and having a sensor for providing information from a wheel of the vehicle.

In recent years, various information of a load applied to a wheel, a revolution number of a wheel or the like is made to be necessary for carrying out a driving control in running. In order to provide such information, it is proposed to provide a sensor to a rolling bearing assembly for a wheel attached with a wheel of an automobile.

As such a rolling bearing assembly for a wheel known in a background art, there is a bearing assembly including a cylindrical fixed bearing ring fixed to a vehicle body side, a rotary bearing ring provided on an inner side in a diameter direction of the fixed bearing ring, and plural rows of rolling elements rollably provided between the bearing rings, and there is such a bearing assembly provided with the above-described sensor at the fixed bearing ring and constituted to provide information of the rotary bearing ring by the sensor (refer to, for example, JP-A-2002-340922).

The bearing assembly described in JP-A-2002-340922 is formed with a through hole penetrated in the diameter direction at the fixed bearing ring, the sensor is inserted and fixed to the through hole. Further, a measuring portion of the sensor is made to be opposed to an outer peripheral surface of the rotary bearing ring and the sensor acquires information of the rotary bearing ring.

However, according to the rolling bearing assembly for the wheel as described in JP-A-2002-340922, it is necessary to form a plurality of the through holes at the fixed bearing ring in order to provide a plurality of the sensors at the fixed bearing ring. In this case, a separate boring processing is needed in a step of fabricating the fixed bearing ring, further, it is necessary to attach the sensors to the respective through holes, and an assembly operation becomes complicated. Further, there poses a problem that it is necessary for the respective sensors to adjust gaps between the sensors and the rotary bearing ring, and a number of assembling steps is increased.

SUMMARY OF THE INVENTION

An object of the invention is to provide a rolling bearing assembly for a wheel capable of ensuring a performance of sealing a displacement sensor provided at a sensor housing without using a lid member.

Further, an object of the invention is to provide a rolling bearing assembly for a wheel capable of achieving long service life of a bearing by preventing the bearing from being damaged by a failure in lubrication.

Further, an object of the invention is to provide a rolling bearing assembly for a wheel capable of promoting a reliability of a sensor by preventing the sensor from being destructed by a vibration or preventing the sensor from being not functioned, and preventing the sensor circuit from being short circuited by dew condensation.

A rolling bearing assembly for a wheel according a first aspect of the invention includes:

a cylindrical fixed bearing ring fixed to a vehicle body side;
a rotary bearing ring rotatably inserted into the fixed bearing ring;
plural rows of rolling elements rollably arranged between the fixed bearing ring and the rotary bearing ring;
an annular sensor housing attached to an inboard side end portion of the fixed bearing ring, wherein the annular sensor housing includes a plurality of displacement sensors that detect gaps between the plurality of displacement sensors and an outer peripheral surface of an inboard side end portion of the rotating bearing ring, the plurality of displacement sensors being arranged in a circumferential direction thereof; and
an inboard side seal device that seals an inboard side end portion of the sensor housing.

According to the rolling bearing assembly for the wheel according to the first aspect of the invention, the inboard side end portion of the sensor housing is sealed by the inner side seal device, and therefore, the lid member for closing the inboard side end portion of the sensor housing can be omitted in respective embodiments of the first and the second proposals. Therefore, the embodiment is easily applicable not only to a driven wheel but also to a drive wheel while ensuring a performance of sealing the displacement sensor.

The plurality of displacement sensors can be constituted by first and second displacement sensors for detecting the gaps at positions of a peripheral side surface of the rotary bearing ring remote from each other in an axial direction. In this case, the first sensor member and the second sensor member detect the gaps at the positions remote from each other in the axial direction at the peripheral side surface of the rotary bearing ring, and therefore, a moment load applied to the wheel can be calculated based on a difference of detection values detected by the respective sensor members. In this way, the moment load of the wheel can be calculated only by the first and the second sensor members for detecting physical quantities changed in accordance with a displacement of the peripheral side surface of the rotary bearing ring. Therefore, it is not necessary to further provide a sensor for detecting an axial displacement of the axial end surface of the rotary bearing ring for measuring the moment load. Therefore, the embodiment is applicable also to a bearing assembly for a drive wheel connected with a constant velocity joint of a drive shaft.

It is preferable that an outboard side end portion of the sensor housing is sealed by an outboard side seal device, an annular sensor target is provided at an outer peripheral surface of an inboard side end portion of the rotary bearing ring, the plurality of displacement sensors are constituted to detect gaps between the sensors and an outer peripheral surface of the sensor target, and the sensor target and a seal metal core of the inboard side seal device are integrally formed. According to this structure, long service life of the bearing can be achieved by preventing the bearing from being damaged by a failure in lubrication by making grease at inside of the bearing flow out to inside of the sensor housing. Further, in a structure in which the gap is detected by the displacement sensor using the sensor target provided at the inboard side end portion of the rotary bearing ring, by integrating the seal metal core of the inboard side seal device for sealing the inboard side end portion and the sensor target, the structure can be simplified by reducing a number of parts.

A rolling bearing assembly for a wheel according to a second aspect of the invention includes:

a cylindrical fixed bearing ring fixed to a vehicle body side;
a rotary bearing ring rotatably inserted into the fixed bearing ring;
plural rows of rolling elements rollably arranged between the fixed bearing ring and the rotary bearing ring;
an annular sensor housing attached to an inboard side end portion of the fixed bearing ring, wherein the annular sensor housing includes a plurality of displacement sensors that detect gaps between the plurality of displacement sensors and an outer peripheral surface of an inboard side end portion of the rotating bearing ring, the plurality of displacement sensors being arranged in a circumferential direction thereof; and an outboard side seal device that seals an outboard side end portion of the sensor housing.

According to the rolling bearing assembly for the wheel according to the second aspect of the invention, long service life of the bearing can be achieved by preventing the bearing from being damaged by a failure in lubrication by making a grease at inside of the bearing flow out to inside of the sensor housing. Further, the opening end of the sensor housing is closed by the lid member, and therefore, water, dirt or the like can be prevented from invading inside of the sensor housing.

The plurality of displacement sensors can be constituted by first and second displacement sensors for respectively detecting the gaps at positions remote from each other in an axial direction at a peripheral side surface of the rotary bearing ring. In this case, the first sensor member and the second sensor member detect the gaps at the positions remote from each other in the axial direction at the peripheral side surface of the rotary bearing ring. Therefore, a moment load applied to the wheel can be calculated based on a difference of detection values detected by the respective sensor members. The moment load of the wheel can be calculated only by the first and the second sensor members for detecting the physical quantities changed in accordance with a displacement of the peripheral side surface of the rotary bearing ring in this way. Therefore, it is not necessary to further provide a sensor for detecting an axial displacement of the axial end surface of the rotary bearing ring for measuring the moment load.

It is preferable that the lid member includes an axial displacement sensor for detecting a gap between the displacement sensor and an axial end surface of the inboard side end portion of the rotary bearing ring. In this case, the axial displacement sensor can detect a change in the gap between the sensor and the axial end surface of the inboard side end portion of the rotary bearing ring produced by a load in the axial direction applied to the wheel.

According to the rolling bearing assembly for the wheel of the invention, a performance of sealing the displacement sensor provided at the sensor housing can be ensured without using the lid member. Further, long service life of the bearing can be achieved by preventing the bearing from being damaged by a failure in lubrication.

Further, a rolling bearing assembly for a wheel of the invention includes:

a cylindrical fixed bearing ring fixed to a vehicle body side;

a rotary bearing ring rotatably inserted into the fixed bearing ring;

plural rows of rolling elements rollably arranged between the fixed bearing ring and the rotary bearing ring; and an annular sensor housing attached to an inboard side end portion of the fixed bearing ring, wherein the annular sensor housing includes a plurality of displacement sensors that detect gaps between the plurality of displacement sensors and an outer peripheral surface of an inboard side end portion of the rotating bearing ring, the plurality of displacement sensors being arranged in a circumferential direction thereof, wherein the displacement sensors are covered by a synthetic resin or a rubber species material to be integrated with the sensor housing.

According to the rolling bearing assembly for the wheel of the invention, since the displacement sensor is covered by the synthetic resin or the rubber species material to be integrated to the sensor housing, a wiring, a part or the like constituting the sensor can solidly be fixed, and it can effectively be prevented that the wiring is disconnected by a vibration, a part is destructed. Further, it can also be prevented that fixing of the displacement sensor is loosened by a vibration, a rattle is brought about in the displacement sensor, or the function of the sensor is hampered. Further, since the displacement sensor is covered by the synthetic resin or the rubber species material, it can be prevented that water by dew condensation or the like invades a sensor circuit of the displacement sensor to short circuit the sensor circuit. A reliability of the sensor can be promoted by preventing a drawback caused by the vibration or the dew condensation from being brought about. Further, since the sensor is completely shielded, a foreign matter of dirt or the like can be prevented from invading inside of the sensor at midway of carrying the bearing assembly.

The plurality of displacement sensors can be constituted by first and second displacement sensors for respectively detecting the gaps at positions of peripheral side surfaces of the rotary bearing ring remote from each other in an axial direction. In this case, the first sensor member and the second sensor member detect the gaps at the positions of the peripheral side surface of the rotary bearing ring remote from each other in the axial direction. Therefore, a moment load applied to the wheel can be calculated based on a difference of detection values detected by the respective sensor members. In this way, the moment load of the wheel can be calculated only by the first and the second members for detecting physical quantities changed in accordance with a displacement of the peripheral side surface of the rotary bearing ring. Therefore, it is not necessary to increase a sensor for detecting a displacement in the axial direction of an axial end surface of the rotary bearing ring for measuring the moment load. Accordingly, the invention is applicable also to a bearing assembly for a drive wheel connected with a constant velocity joint of a drive shaft.

According to the rolling bearing assembly for the wheel of the invention, it can be prevented that the sensor is destructed or the sensor is not functioned by a vibration, and it can be prevented that the sensor circuit is short circuited by dew condensation.

BRIEF DESCRIPTION OF THE DRAWINGS

FIG. 14A shows a linear line graph of m/z and $x_i$ in a pure moment state.

FIG. 14B is a linear line graph of mx and $z_i$ in a pure moment state.

FIG. 14C shows an equation showing a method of calculating correction coefficients kz and kx.

DESCRIPTION OF PREFERRED EMBODIMENTS

An embodiment of a rolling bearing assembly for a wheel of the invention (hereinafter, also referred to simply as bearing assembly) will hereinbelow be described with reference to the accompanying drawings.

Bearing Assembly According to First Aspect

Figure 1:
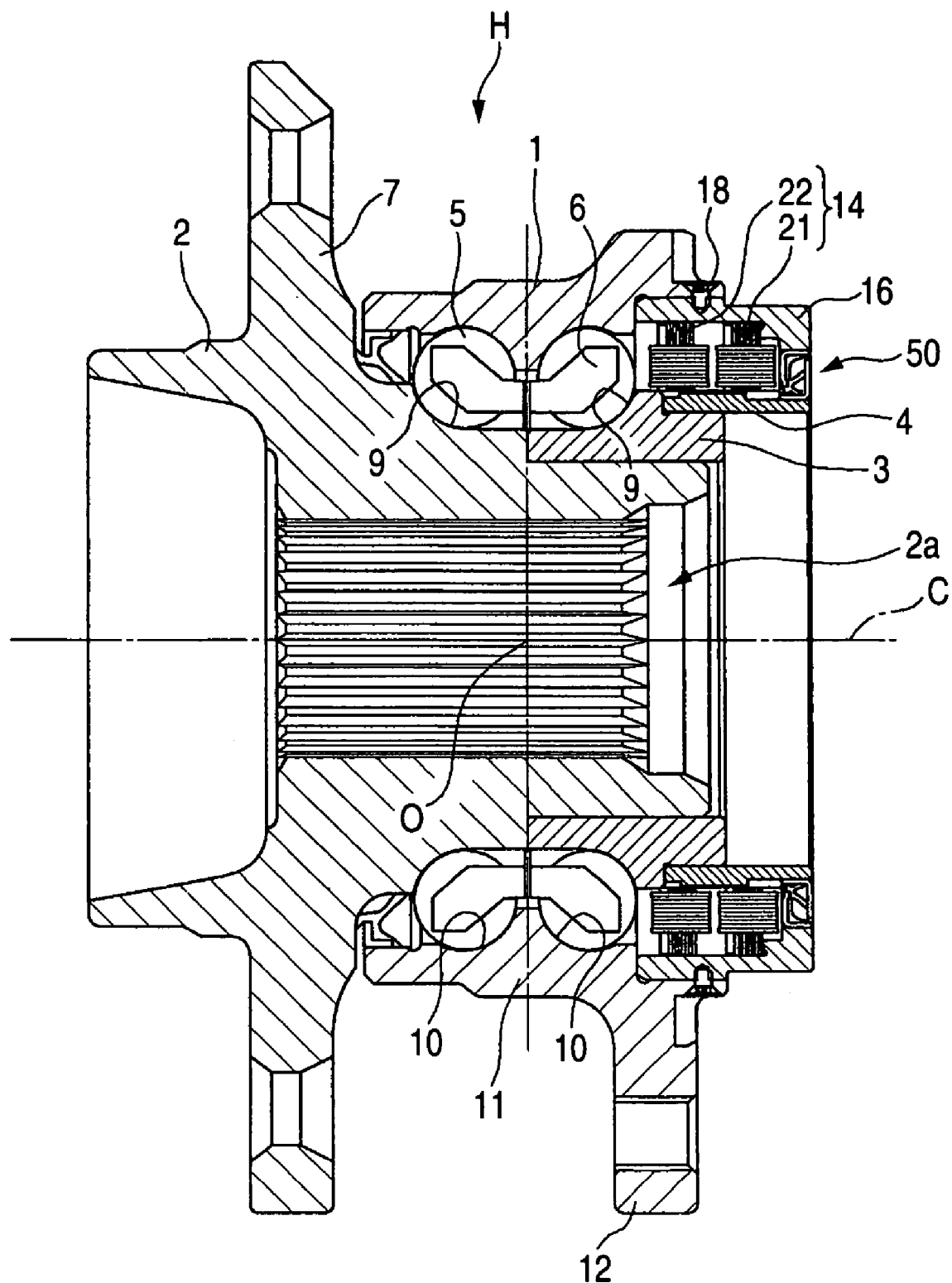
FIG. 1 is an explanatory view of a section in an axial direction according to an embodiment of a bearing assembly according to a first aspect of the invention.
Figure 2:
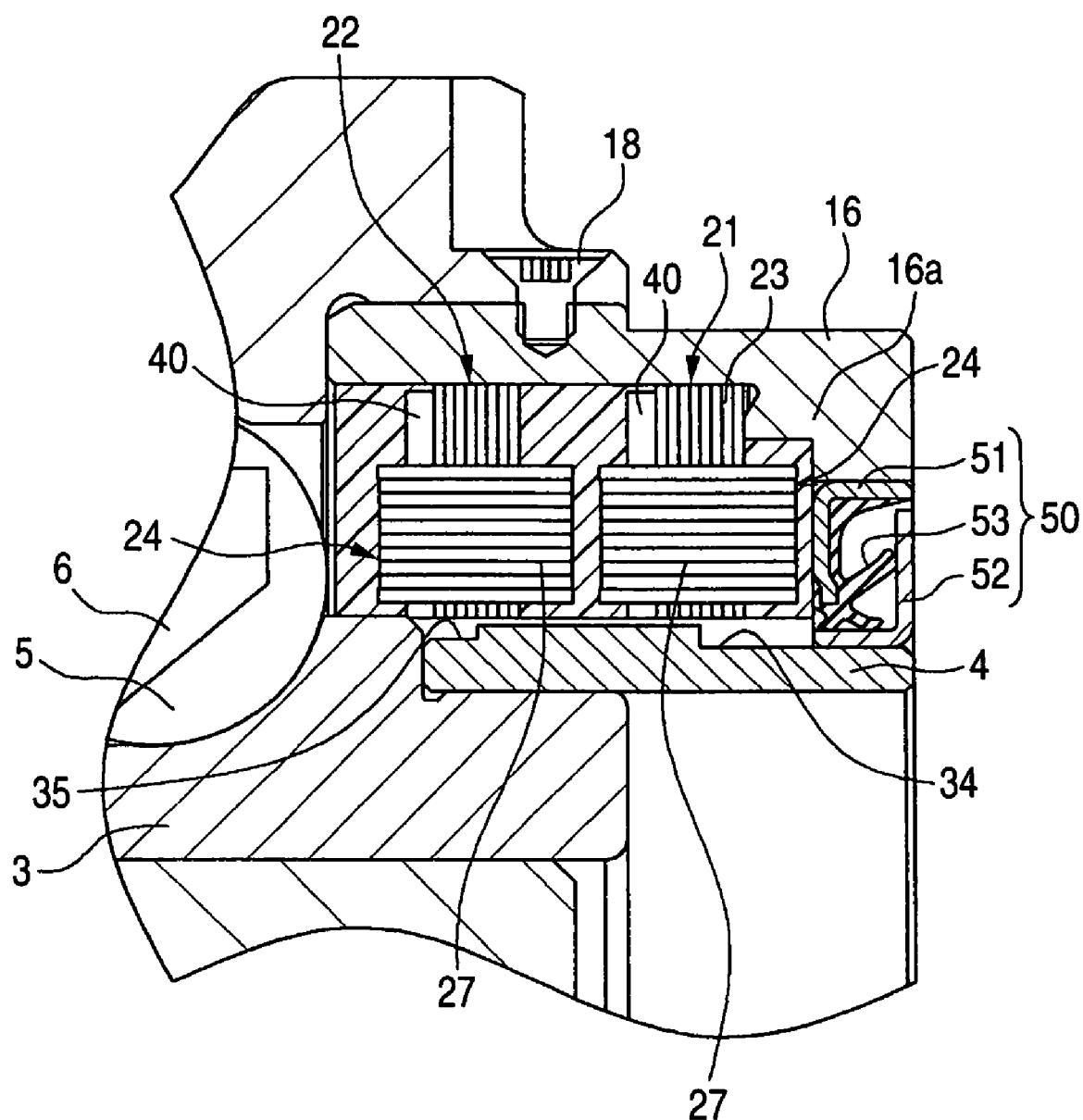
FIG. 2 is a view enlarging a portion of the bearing assembly shown in FIG. 1.

FIG. 1 is an explanatory view of an axial section of a bearing assembly according to one embodiment of a first aspect of the invention, FIG. 2 is a view enlarging a portion of the bearing assembly shown in FIG. 1. Further, in FIGS. 1 through 2 and FIGS. 3 through 6 mentioned later, a right side is an inboard side (inner side of a vehicle) and a left side is an outboard side (outer side of a vehicle).

[Overall Structure of Bearing Assembly]

As shown by FIG. 1, a bearing assembly H of the embodiment includes a cylindrical outer ring 1, an inner shaft 2 rotatably inserted to inside of the outer ring 1, an inner ring member 3 outwardly fitted to an inboard side end portion of the inner shaft 2, a sensor target 4 outwardly fitted to an inboard side end portion of the inner ring member 3, and plural rows of rolling elements 5, 5 each including a plurality of balls aligned in a circumferential direction, and a double row angular ball bearing portion is constituted thereby. Respective rows of the balls as the rolling elements 5, 5 are held at predetermined intervals in a circumferential direction by a cage 6. The bearing assembly H is a bearing assembly for a drive wheel. A shaft portion integrally formed with a cup-shape outer ring member of a constant velocity joint is fitted to an inserting hole 2a formed at the inner shaft 2 by a spline from an inboard side, although not illustrated.

Figure 17:
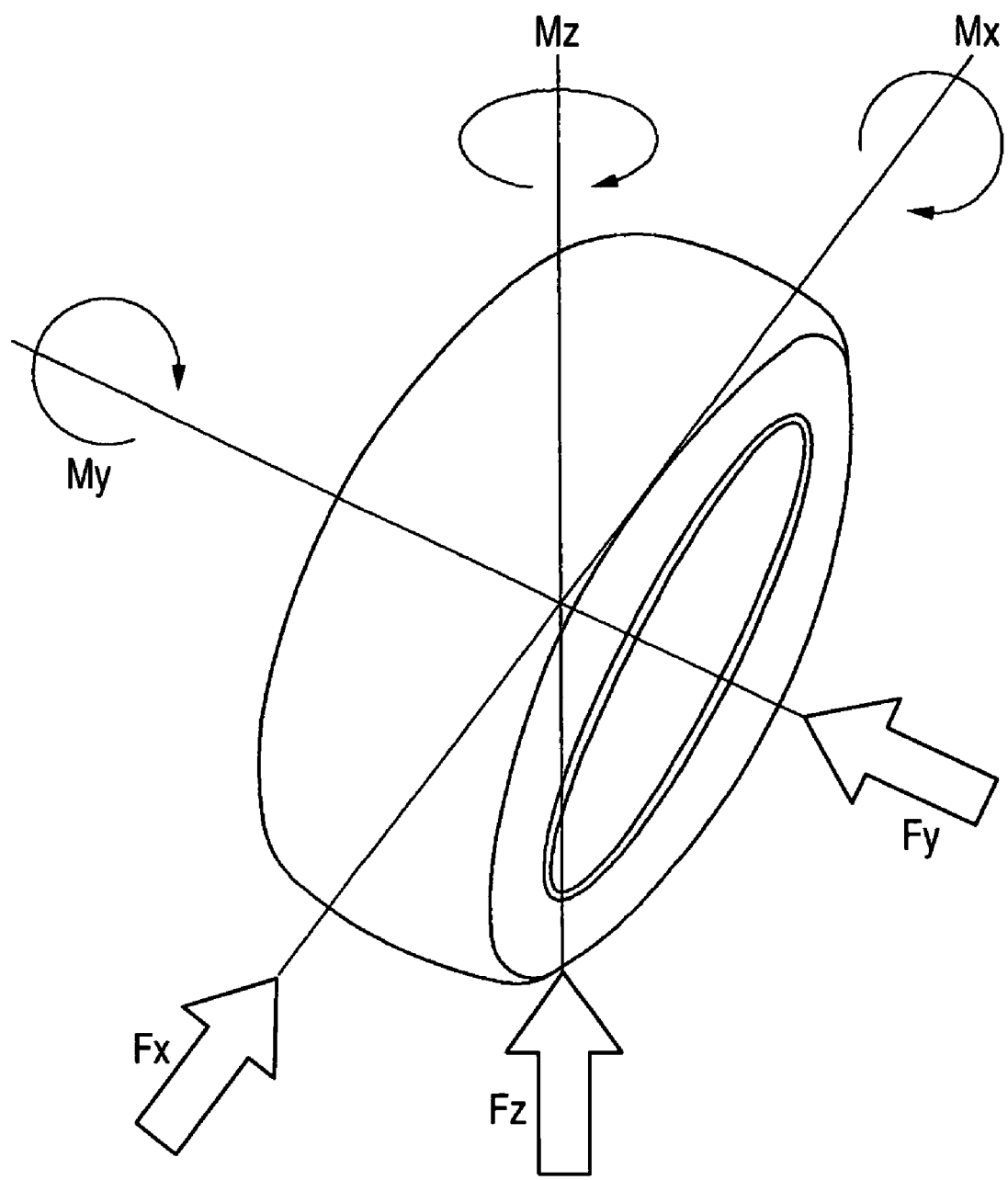
FIG. 17 is a perspective view of a wheel portion showing an x axis direction, a y axis direction and a z axis direction and definitions of respective loads.

In the specification, a direction along a center line C of the bearing assembly H is defined as a y axis direction, a horizontal direction in a direction of penetrating a paper surface orthogonally to the y axis direction is defined as an x axis direction, and a vertical direction orthogonal to the y axis direction and the x axis direction is defined as a z axis direction. Therefore, as shown by FIG. 17, the x axis direction becomes a front-rear horizontal direction of a wheel, the y axis direction becomes a left-right horizontal direction (axial direction) of the wheel, and the z axis direction becomes a vertical direction.

According to the bearing assembly H of the embodiment, the outer ring 1 is made to constitute a fixed bearing ring fixed on a vehicle body side. On the other hand, the inner shaft 2 and the inner ring member 3 and the sensor target 4 are made to constitute a rotary bearing ring on a wheel side, and the plural rows of rolling elements 5, 5 are rollably interposed between the fixed bearing ring and the rotary bearing ring. Thereby, the fixed bearing ring and the rotary bearing ring are arranged coaxially with each other, and the rotary bearing ring is made to be rotatable relative to the fixed bearing ring along with a wheel (tire and tire wheel shown in FIG. 17).

The inner shaft 2 constituting the rotary bearing ring includes a flange portion 7 extended to an outer side in a diameter direction on an outboard side, and the flange portion 7 constitutes a portion of attaching the tire wheel of the wheel or a brake disk. The tire wheel or the like is attached to the flange portion 7 by an attaching bolt, not illustrated. The inner ring member 3 is outwardly fitted to a stepped difference portion formed on an inboard side of the inner shaft 2. Further, an outer peripheral surface of the inner shaft 2 and an outer peripheral surface of the inner ring member 3 are respectively formed with inner side raceway surfaces 9, 9 of the rolling members 5, 5.

The outer ring 1 constituting the fixed bearing ring includes a cylindrical main body cylinder portion 11 formed with outer side raceway surfaces 10, 10 of the rolling elements 5, 5 at inner peripheral surfaces thereof, and a flange portion 12 extended from an outer peripheral surface of the main body cylinder portion 11 to an outer side in a diameter direction. The flange portion 12 is fixed to a knuckle (not illustrated) of a suspension constituting a vehicle body side member to thereby fix the bearing assembly H to a vehicle body side.

The bearing assembly H of the embodiment includes a sensor apparatus 14 for detecting a physical quantity changed in accordance with a displacement of an outer peripheral side surface of the sensor target 4 (according to the embodiment, an inductance changed by a gap between the sensor apparatus and the outer peripheral side surface of the sensor target 4) provided at the rotary bearing ring, and a sensor housing 16 for attaching the sensor apparatus 14 to the outer ring 1 constituting the fixed bearing ring. The sensor housing 16 comprises a cylinder member in a shape of a short cylinder and the cylinder member is fabricated by a metal member in a shape of a cylinder short in an axial direction. Further, the cylinder member is fixed to an inboard side end portion of the outer ring 1 by a fixing screw 18 coaxially with the outer ring 1 at an opening portion on one end side (outboard side) thereof.

An inboard side end portion of the sensor housing 16 is sealed by a pack seal 50 constituting an inner side seal device to be able to prevent a foreign matter of dirt or the like from invading inside of the sensor. Further, the sensor housing 16 can also be fixed to the outer ring 1 by being press-fitted to an inner diameter surface of the outer ring 1 without using the fixing screw 18.

[Structure of Sensor Appartus]

Figure 7:
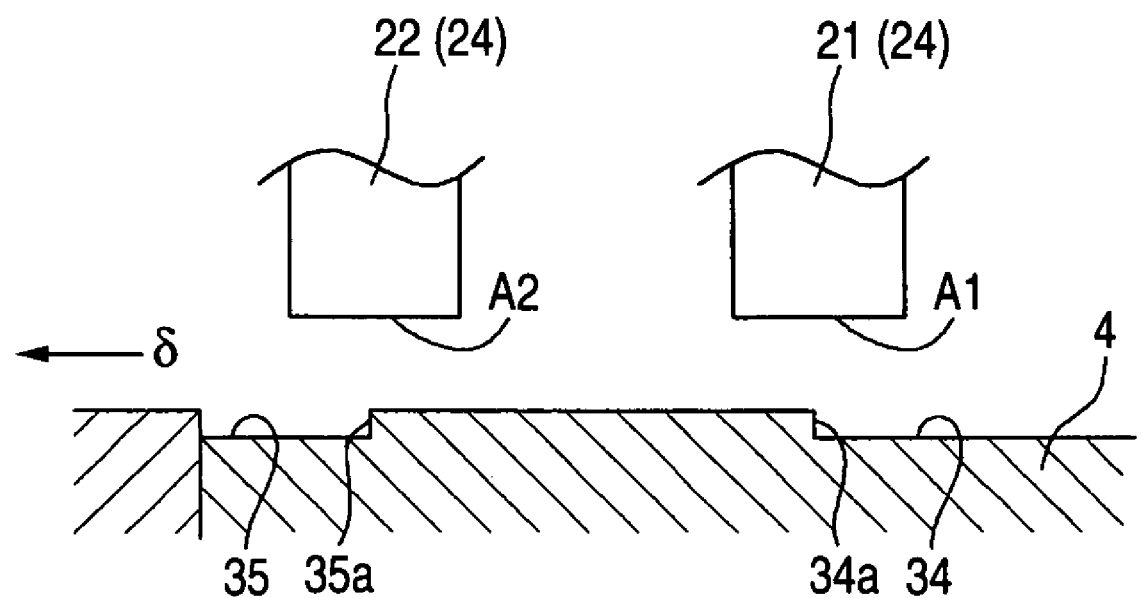
FIG. 7 is a view showing a positional relationship between a displacement sensor and a stepped portion of the bearing assembly shown in FIG. 1.
Figure 8:
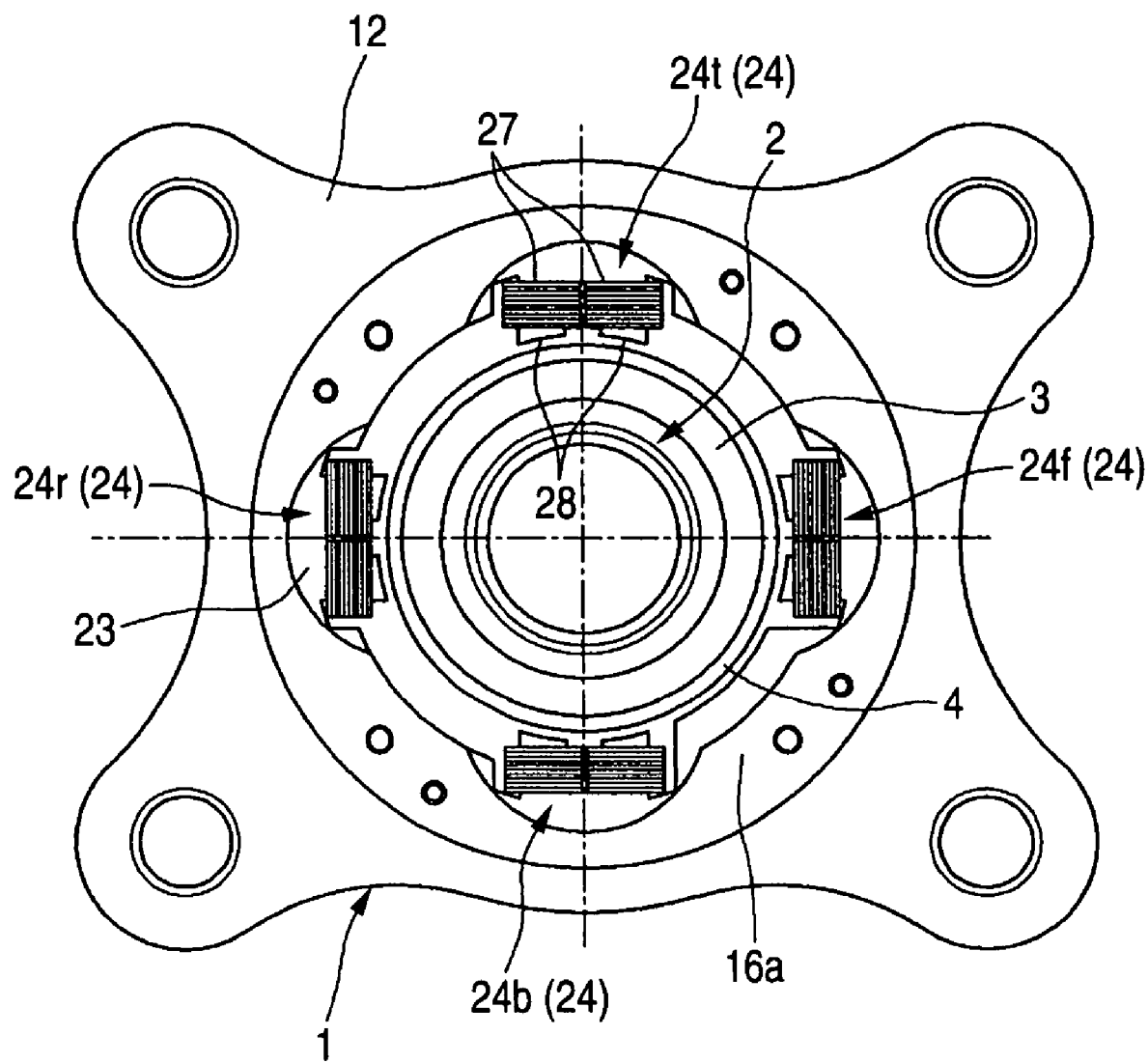
FIG. 8 is a view of the bearing assembly shown in FIG. 1, viewing a state of detaching an inner side seal device thereof from an inboard side.

As shown in FIGS. 7 and 8, the sensor device 14 of the embodiment includes a first sensor member 21 and a second sensor member 22 which detect respective gaps as determined at axially spaced positions on the outside surface of the target position 4. It is noted herein that the term "first", concerning the sensor device 14 and the sensor target 4, means the inboard side whereas the term "second" means the outboard side.

The first and second sensor members 21, 22 are inductance-type displacement sensors which each detect the variations of the gap between itself and the outside surface of the sensor target 4 based on inductance variations. The first and second sensor members include: a ring-shaped sensor core 23 mounted to the inside surface of the sensor housing 16 in axially spaced two lines; and a plurality of displacement sensors 24 (four sensors in this embodiment) arranged circumferentially of each sensor ring 23 at predetermined space intervals. The sensor rings 23 are fixed to a rib portion 16a of the sensor housing 16 by a fixing screw as sandwiching a cylindrical spacer (not illustrated) therebetween.

The displacement sensors 24 of each of the first and second sensor members 21, 22 are disposed at four positions including front, rear, top and bottom positions. The displacement sensors are so disposed as to detect the variations of the gap between the sensors and the outside surface of the sensor target 4 on the rotary bearing ring with respect to the x-axis and the z-axis directions.

Specifically, the first sensor member 21 on the inboard side includes: a first front sensor 24f and a first rear sensor 24r disposed at front and rear positions of the rotary bearing ring; and a first top sensor 24f and a first bottom sensor 24b disposed at top and bottom positions of the rotary bearing ring. The second sensor member 22 on the outboard side also includes a second front sensor 24f and a second rear sensor 24r disposed at a front and rear positions of the rotary bearing ring; and a first top sensor 24f and a second bottom sensor 24b disposed at top and bottom positions of the rotary bearing ring.

Each of these eight displacement sensors 24 (f, r, t, b) is constituted by serially connecting a pair of coil elements 27, 27 individually having an independent detection surface to the sensor target 4 and closely adjoining each other in the circumferential direction. The pair of coil elements 27, 27 are constituted by winding coil about a pair of magnetic poles 28 projecting from an inside surface of the sensor ring 23. These magnetic poles 28 project radially inwardly from the sensor ring 23 so that radial-inboard end surfaces thereof (detection surfaces) confront the outside surface of the sensor target 4 via a radial gap therebetween.

According to the bearing assembly H of the embodiment, the first and second sensor members 21, 22, axially spaced from each other, are integrally mounted to the sensor housing 16 to constitute a sensor unit, each sensor member including the four displacement sensors 24 disposed at the front, rear, top and bottom positions. Therefore, when the bearing assembly H is assembled, all the displacement sensors 24 can be mounted to the outer ring 1 simply by mounting the sensor housing 16 to the inboard end of the outer ring 1. This negates the need for discretely mounting each of the displacement sensors 24 to the outer ring 1. What is more, the outer ring 1 need not be formed with through-holes for mounting the sensors.

The individual displacement sensors 24 can be circumferentially and radially positioned relative to the sensor target 4 on the rotary bearing ring by mounting the sensor housing 16 to the outer ring 1. Therefore, each of the displacement sensors 24 need not be mounted as making positional adjustment. This leads to quite an easy assembly work of the bearing assembly H.

The displacement sensors 24 incorporated in the sensor housing 16 have an advantage of detecting the gap with increased accuracies because the sensors detect the gap varying in conjunction with the deformation behavior of the sensor target 4 located at the inboard end of the rotary bearing ring, which exhibits a greater deformation behavior under external force than that of an axially central portion (portion near the center of the bearing O shown in FIG. 1) of the rotary bearing ring.

In a case where the sensor housing 16 is mounted to the inboard end of the outer ring 1, the displacement sensors 24 are disposed at places relatively far away from the flange 12 of the outer ring 1, so that the sensors are less affected by the strain of peripheral portions of the flange 12. This leads to an advantage that the sensors are capable of highly accurately detecting the gap variations.

Further, according to the embodiment, the sensor housing 16, the sensor core 23, the coil element 27 and a wiring board 40 arranged on the sensor core 23 for wiring the coil element and a lead wire for outputting a detecting signal are sealed (molded) by a thermosetting resin of epoxy species, acrylic species or the like, or a thermoplastic resin of PPS, PA, ABS. In other words, the displacement sensor 24 is covered by a synthetic resin and is integrated with the sensor housing 16. Thereby, the wiring board 40 can solidly be fixed to the sensor core 23, whereby an electric element on the wiring board 40 is prevented from being destructed, or the coil element 27 is prevented from being disconnected. Further, the sensor can be prevented from being not functioned due to loosening of a fixing screw for fixing the sensor core 23 to the sensor housing 16 by a vibration and a rattle about in the sensor core 23. Further, by sealing the wiring board 40, the wiring can be prevented from being short circuited by water of dew condensation or the like. Further, the wiring board 40 or the like may be shielded (molded) by a rubber species material.

Figure 9A:
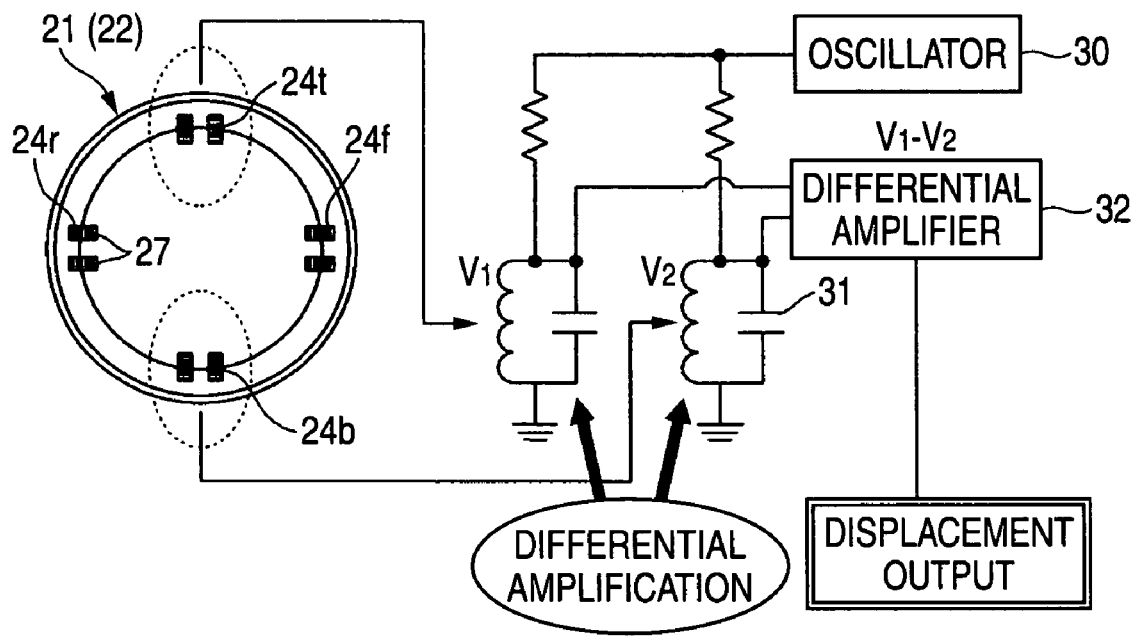
FIG. 9A is a circuit diagram showing an example of a circuit of detecting a gap by a sensor apparatus.

FIG. 9A illustrates an exemplary gap-detecting circuit of the sensor device 14 of the embodiment. As shown in the figure, among the displacement sensors 24 of each of the sensor members 21, 22, the sensors 24t, 24b vertically opposing each other (the top sensor and the bottom sensor in FIG. 9) are connected to an oscillator 30, which supplies an AC current of a certain period to the individual sensors 24t, 24b. The sensors 24t, 24b are connected in parallel with respect capacitors 31 for synchronization.

The embodiment uses a differential amplifier 32 for providing an output voltage (detection value) corresponding to a quantity of vertical displacement by calculating a difference between the output voltages (detection values) from the individual sensors 24t, 24b. Thus, temperature-induced drift is eliminated from the detection value. Although not shown in the figure, the same differential amplifier as the above is also used to determine a difference between the detection values from the sensors mutually opposing in the horizontal direction, thereby eliminating the temperature-induced drift.

By the way, the following equation (a) is established in the inductance-type displacement sensor 24:

$$L = A \times \mu \times N^2 / d \tag{a}$$

wherein L represents the coil inductance, A represents the area of the detection surface, μ represents the magnetic permeability, N represents the number of coils, and d represents the distance (gap) between the detection surface and the sensor target 4.

When the distance d to the sensor target 4 is varied, the inductance L of the displacement sensor 24 is varied so that the output voltage is varied. Therefore, the radial gap between the detection surface of the displacement sensor 24 and the sensor target 4 can be detected by detecting the variations of the output voltage.

Figure 9B:
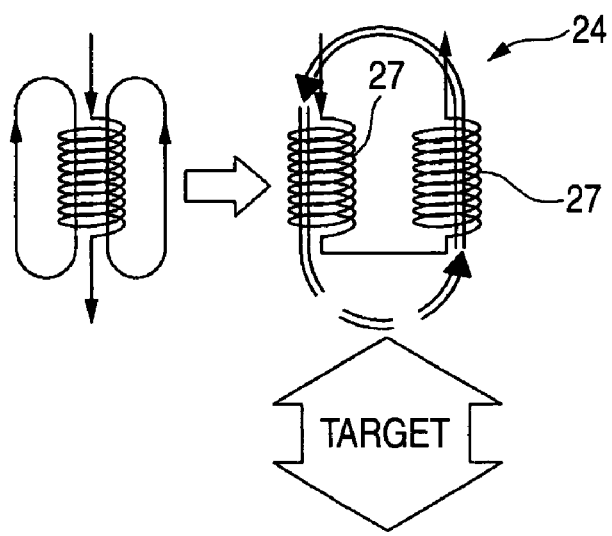
FIG. 9B is an explanatory view of a function of a coil element.

In this embodiment, one displacement sensor 24 is constituted by serially connecting a pair of coil elements 27 each possessing the independent detection surface to the sensor target 4. Hence, this displacement sensor is adapted to produce magnetic flux in higher density as compared with a case where one displacement sensor 24 is constituted by one coil element 27, as shown in FIG. 9B. Thus, the displacement sensor 24 is further increased in detection sensitivity of the distance to the sensor target 4.

[Structure of Sensor Target]

As shown in FIGS. 1 and 2, the sensor target 4 is formed of a cylindrical member fitted about the inboard end of the inner ring member 3. The outside surface of the sensor target 4 is formed with a first annular detection subject (stepped portion) 34 confronting the detection surface (tip face of the magnetic pole 28) of the first sensor member 21 on the inboard side, and a second annular detection subject (stepped portion) 35 confronting the detection surface of the second sensor member 22 on the outboard side. In this embodiment, these detection subjects 34, 35 are defined by first and second stepped portions formed along the circumferential direction of the sensor target 4.

As shown in FIG. 7, the first stepped portion 34 on the inboard side is disposed in a manner to have its end face 34a located in proximity of the center of a detection surface A1 of the first sensor member 21, whereas the second stepped portion 35 on the outboard side 35 is disposed in a manner to have its end face 35a located in proximity of the center of a detection surface A2 of the second sensor member 22.

If the sensor target 4 of the rotary bearing ring is axially displaced toward the outboard side by a distance 6, for example, an axial overlap length between the first sensor member 21 and the first stepped portion 34 on the inboard side is increased so that the first sensor member 21 provides an increased detection value of the gap. On the other hand, an axial overlap length between the second sensor member 22 and the second stepped portion 35 on the outboard side is decreased so that the second sensor member 22 provides a decreased detection value of the gap.

Similarly, if the sensor target 4 of the rotary bearing ring is axially displaced toward the inboard side by the distance 5, the first sensor member 21 on the inboard side provides a decreased detection value of the gap, whereas the second sensor member 22 on the outboard side provides an increased detection value of the gap.

Thus, the sensor target 4 of the embodiment is provided with the pair of stepped portions 34, 35 on the outside surface thereof, which are axially spaced from each other so as to produce a difference between the detection values obtained by the first and second sensor members 21, 22 when the rotary bearing ring is displaced in the same sense of the axial direction.

As described above, the stepped portions 34, 35 have their axial positions relative to the sensor side defined such that the respective detection values obtained by these sensor members 21, 22 may be varied in the opposite way (plus minus) when the rotary bearing ring is displaced in the same sense of the axial direction.

As apparent from a calculation method taken by a control unit (to be described herein later) for determining the detection value, a detection value for axial unit translation quantity of the rotary bearing ring is amplified by calculating the difference between the detection value from the first sensor member 21 on the inboard side and the detection value from the second sensor member 22 on the outboard side. Thus, the sensor device as a whole can be increased in the detection sensitivity of the axial displacement.

The respective displacement sensors 24 constituting the first and second sensor members 21, 22 are connected to the control unit, such as the ECU, on the vehicle side by means of a signal line. The output voltages (detection values) obtained by the individual sensors are calculated by the control unit based on the calculation method to be described herein later, whereby individual direction moment loads and translation loads acting on the wheel are determined.

[Structure of Seal Device]

The pack seal 50 as the inner side seal device is constituted by a seal metal core 51 fixedly provided to the inner peripheral surface of the rib portion 16a of the sensor housing 16, a seal metal core 52 fixedly provided to an outer peripheral surface of an inboard side end portion of the sensor target 4, and a seal member 53 made of rubber fixedly attached to a surface of the seal metal core 51 opposed to the seal metal core 52, and inside of the bearing is sealed by bringing a front end portion of the seal member 53 into press contact with the seal metal core 52.

[Method of Calculating Respective Loads]

Figure 15:
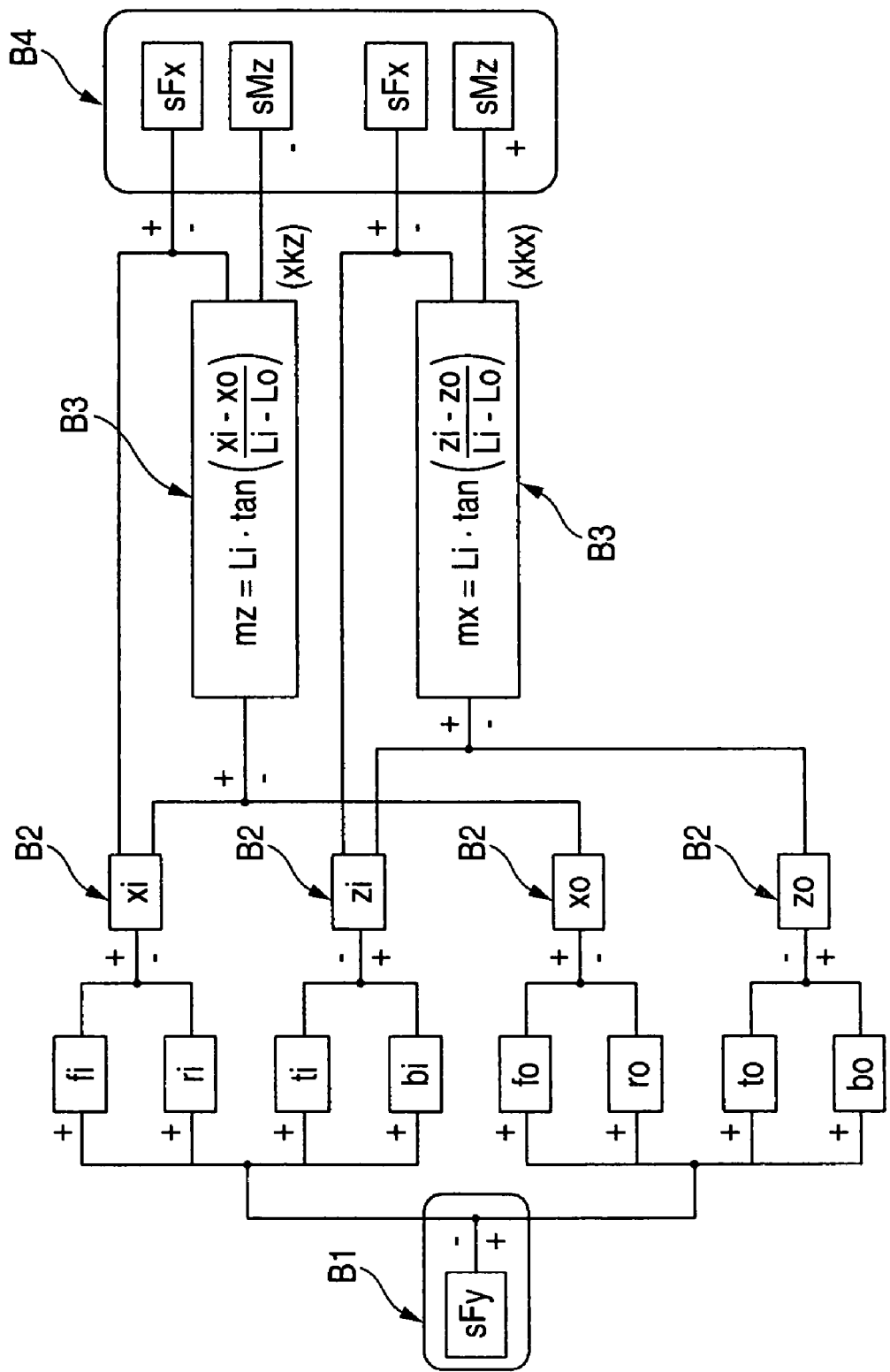
FIG. 15 is a block diagram showing a calculating method by controlling means.

Referring to FIGS. 10 through 17, the following description is made on a load calculation method taken by the control unit. FIG. 15 is a block diagram showing the calculation method taken by the control unit.

[Definition of Direction and Sensor Detection Value]

As shown in FIG. 17, a front-rear horizontal direction of the wheel is defined as the x-axis direction, a lateral horizontal direction (axial direction) of the wheel is defined as the y-axis direction, and a vertical direction of the wheel is defined as the z-axis direction.

Figure 10A:
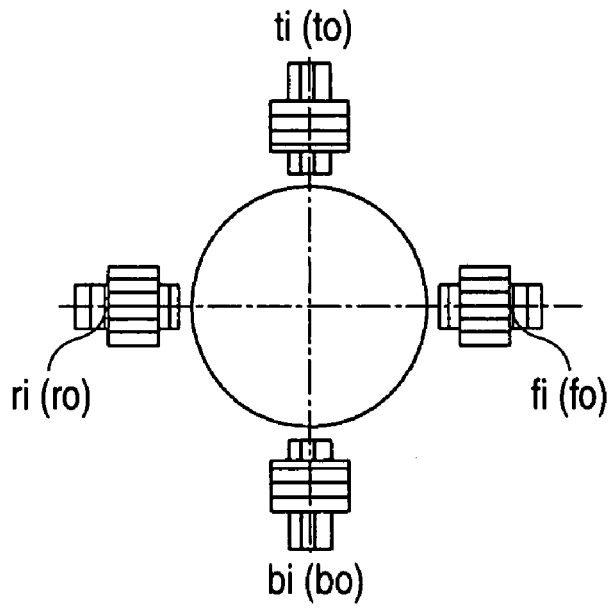
FIGS. 10A and 10B are views showing positions of arranging respective displacement sensors and definitions of detection values thereof.
Figure 10B:
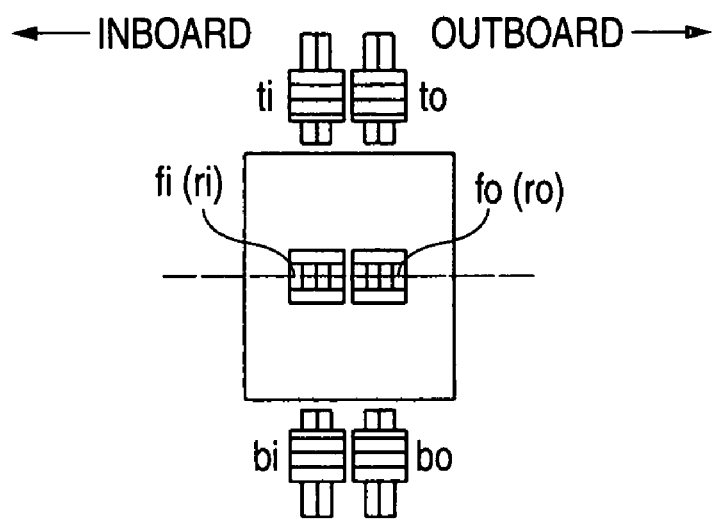

As shown in FIGS. 10A and 10B, a subscript "i" is attached to the detection value from the inboard sensor (the first sensor member 21), whereas a subscript "o" is attached to the detection value from the outboard sensor (the second sensor member 22). In addition, the detection value from the front-side sensor is defined as "f(front)", the detection value from the rear-side sensor is defined as "r(rear)", the detection value from the top sensor is defined as "t(top)", and the detection value from the bottom sensor is defined as "b(bottom)".

Accordingly, the detection values from a total number of eight sensors disposed at the first and second sensor members 21, 22 are defined as follows:

$f_i$: the detection value of the first front sensor $r_i$: the detection value of the first rear sensor $t_i$: the detection value of the first top sensor $b_i$: the detection value of the first bottom sensor $f_o$: the detection value of the second front sensor $r_o$: the detection value of the second rear sensor $t_o$: the detection value of the second top sensor $b_o$: the detection value of the second bottom sensor

[Independent Variable (sFy) Corresponding to Translation load Fy in y Axis Direction]

Figure 11B:
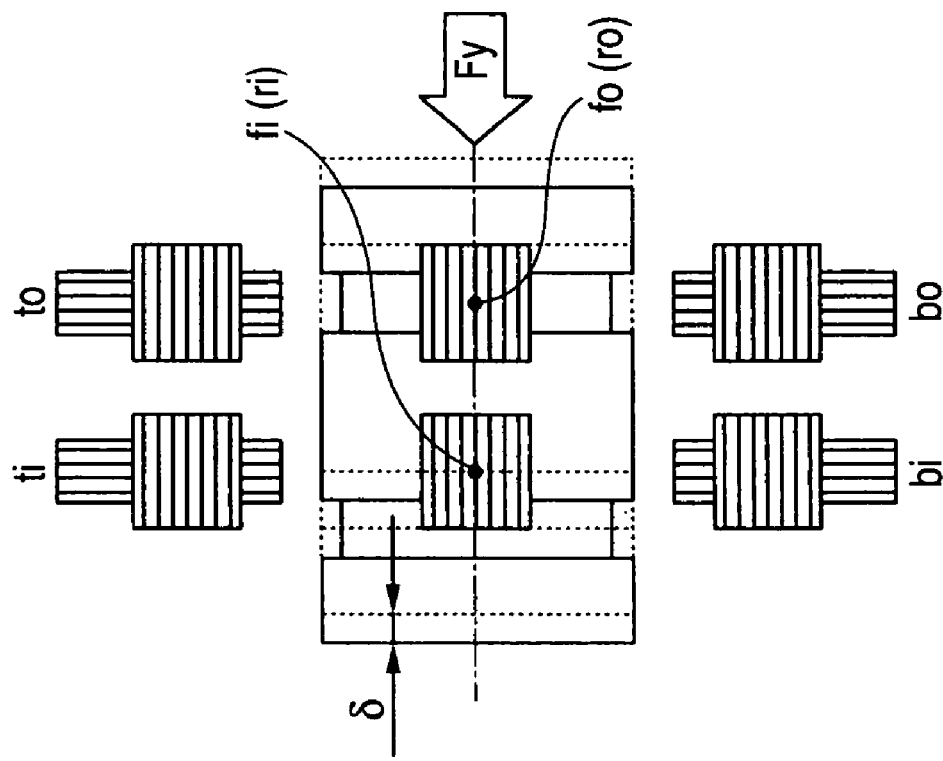
FIG. 11B is a view showing a deformation behavior of a rotary bearing ring by a load Fy.
Figure 11A:
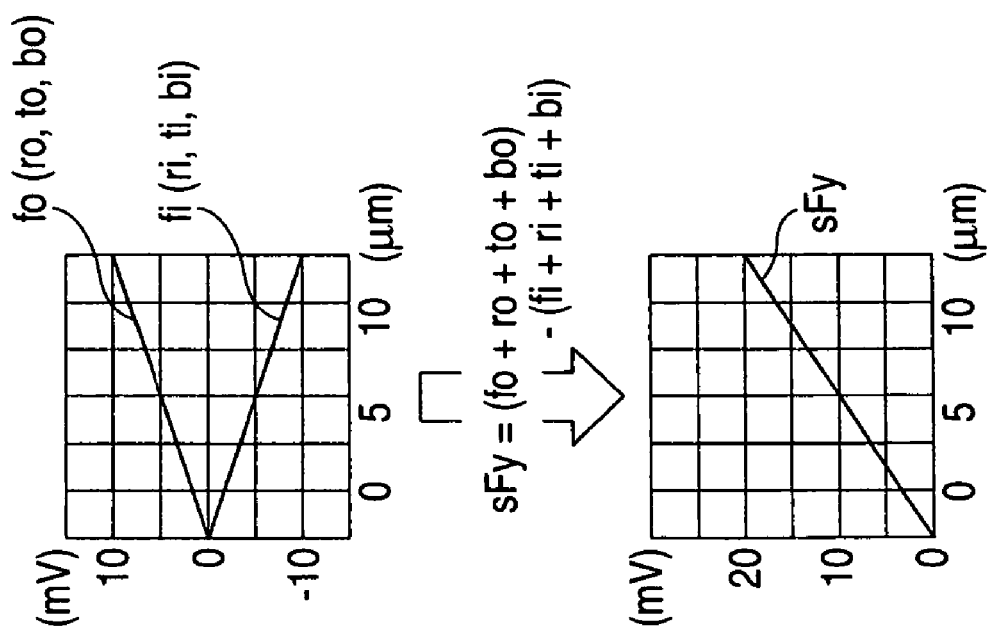
FIG. 11A is a graph showing a method of calculating sXy.

In a case where a y-axis translation load Fy is applied to the wheel, as shown in FIG. 11B, the rotary bearing ring is displaced in the direction of the load so that the stepped portions 34, 35 are shifted in the axial direction. As described above, therefore, all the detection values (output voltages in this embodiment) from the inboard sensors $f_i$, $r_i$, $t_i$, $b_i$ are decreased according to the increase of the movement quantity δ in the axial direction, whereas all the detection values from the outboard sensors $f_o$, $r_o$, $t_o$, $b_o$ are increased according to the increase of the movement quantity δ in the axial direction.

Therefore, sFy calculated based on the following equation (1) is adopted as an independent variable corresponding to the y-axis translation load Fy, as shown in FIG. 11B (see a calculation block B1 in FIG. 15).

$$sFy=(f_i+r_i+t_i+b_i)-(f_o+r_o+t_o+b_o) \quad (1)$$

Thus, the value sFy corresponding to the axial unit translation quantity of the rotary bearing ring is amplified by calculating the difference between the detection values from the inboard sensor and the outboard sensor, whereby the sensor device 14 as a whole can be increased in the detection sensitivity of the axial displacement.

[x Axis Displacement and z Axis Displacement]

As shown in a calculation block B2 of FIG. 15, the detection value of the x-axis displacement is obtained by calculating a difference between the detection value f of the front sensor and the detection value r of the rear sensor, whereas the detection value of the z-axis displacement is obtained by calculating d difference between the detection value t of the top sensor and the detection value b of the bottom sensor.

Since the respective pair of front and rear sensors and of top and bottom sensors are individually affected by the temperature by the same quantity and in the same direction, temperature-induced drift can be eliminated by calculating the difference between the detection values in the aforementioned manner.

Since the embodiment locates the displacement sensors 24 on the inboard side and the outboard side, the detection value of the x-axis displacement and the detection value of the z-axis displacement can be obtained at the respective positions on the inboard side and the outboard side, as indicated by the following equations.

The detection value of the X-axis displacement on the inboard side: $x_i = f_i - r_i$ The detection value of the z-axis displacement on the inboard side: $z_i = -t_i + b_i$ The detection value of the x-axis displacement on the outboard side: $x_o = f_o - r_o$ The detection value of the z-axis displacement on the outboard side: $z_o = -t_o + b_o$

[Independent Variable (sMz) Corresponding to Moment Load Mz Around z Axis]

Figure 12:
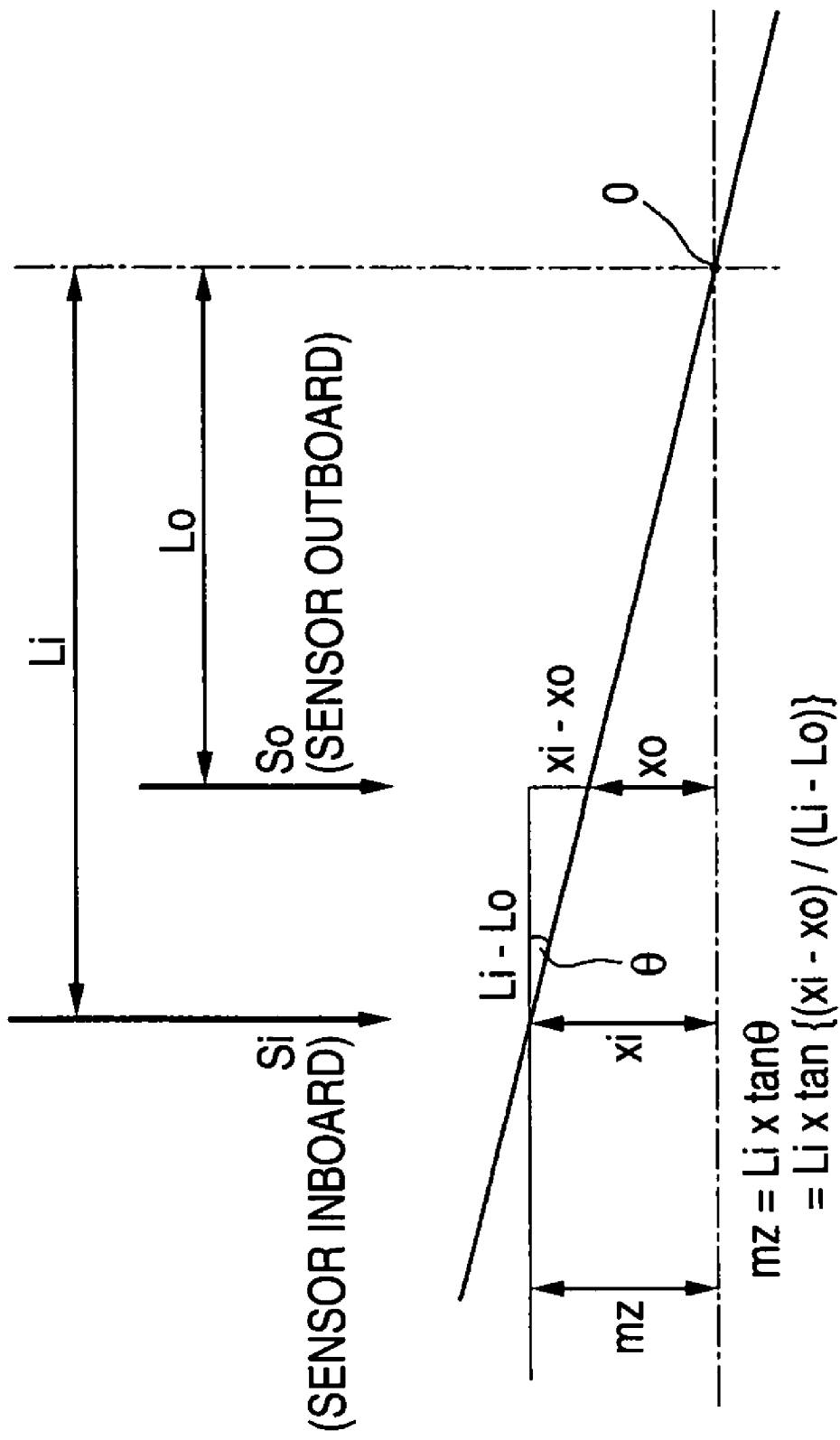
FIG. 12 is a diagram showing a state of deforming the rotary bearing ring in a pure moment state.

Next, a state of net moment where only a moment load Mz about the z-axis acts on the wheel is assumed as shown in FIG. 12.

The detection value corresponding to the moment load Mz about the z-axis can be theoretically defined by a value mz calculated based on the following equation, provided that L1 represents an axial distance from the bearing center O to the detection position of the in board sensor (the first sensor member 21), and that $L_o$ represents an axial distance from the bearing center O to the detection position of the outboard sensor (the second sensor member 22). If θ is small enough, the value mz should agree with $x_i$.

$$mz = L_1 \times \tan\theta$$
$$= L_1 \times \tan((x_i - x_o)/(L_1 - L_o))$$

In actual fact, however, the sensor target 4 is formed with the stepped portions 34, 35 and hence, the value mz does not agree with $x_i$, as indicated by FIG. 14A. FIG. 14A is a linear graph showing a relation between Mz, mz and the detection value $x_i$ when only the moment load Mz about the z-axis is applied to the wheel. As indicated by the graph, the slope of the plot mz does not agree with the slope of the plot of the detection value $x_i$.

As indicated by FIG. 14C, therefore, a correction coefficient kz obtained by dividing the slope of the plot $x_i$ by the slope of the plot Mz is introduced in order to establish the agreement between these slopes. As indicated by the following equation (2), an independent variable sMz corresponding to the moment load Mz about the z-axis is obtained by multiplying the above value mz by the correction coefficient kz (see calculation blocks B3 and B4 of FIG. 15). It is noted that the negative sign (-) on the right side is used for agreement with the sign of another independent variable (such as the above sFy or sMx to be described hereinlater).

$$sMz = -Mz \times kz \quad (2)$$

[Independent Variable (sMx) Corresponding to Moment Load Mx Around x Axis]

The x-axis direction and the z-axis direction are in a relation to be brought into agreement through 90 degrees coordinate transformation. Therefore, the independent variable sMx corresponding to the moment load Mx about the x-axis can be calculated based on the following equation (3) according to the same concept as that of the variable sMz.

$$sMx = Mx \times kx \quad (3)$$

It is noted that kx in the above equation (3) is a correction coefficient introduced for the same purpose as that of the coefficient kz and is obtained by dividing the slope of the plot $z_i$ by the slope of the plot Mx (see FIGS. 14B and 14C).

[Independent Variable (sFz) Corresponding to Translation Load Fz in z Axis Direction]

[Independent Variable (sFx) Corresponding to Translation Load Fx in x Axis Direction]

Figure 13:
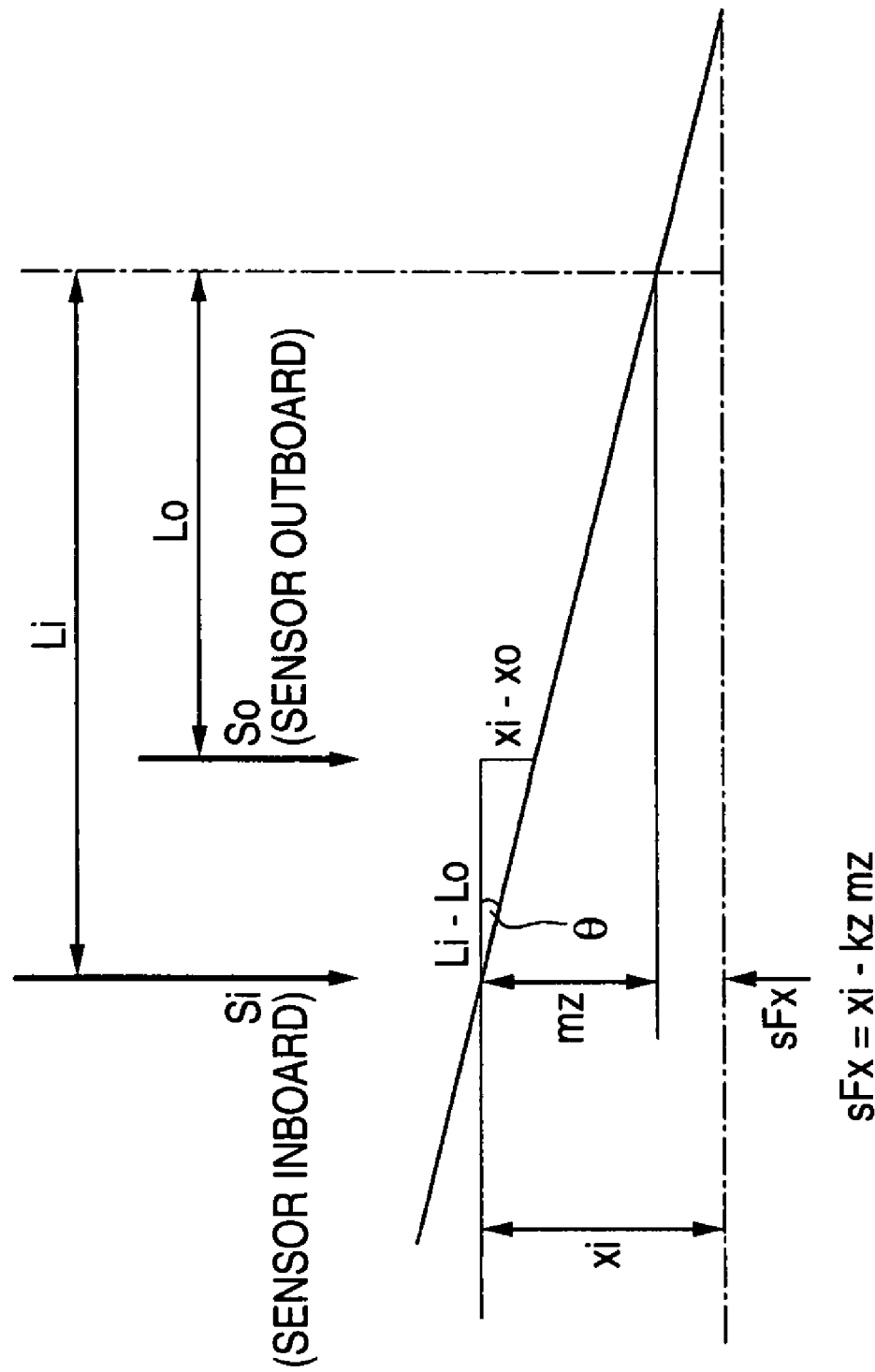
FIG. 13 is a diagram showing a state of deforming the rotary bearing ring when a moment load and a translation load are applied thereto.

Next, a state where the moment load Mz about the z-axis along with an x-axis translation load Fx act on the wheel is assumed, as shown in FIG. 13.

In this case, the detection value $x_i$ of the x-axis displacement on the inboard side contains a component of the independent variable sMz corresponding to the moment load Mz about the z-axis and a component of an independent variable sFx corresponding to the x-axis translation load Fx. Therefore, the independent variable sFx corresponding to the x-axis translation load Fx can be obtained by subtracting the value sMz from the value $x_i$.

This also holds for the case of an independent variable sFz corresponding to a z-axis translation load FZ.

Accordingly, the independent variables sFz corresponding to the z-axis translation load Fz and the independent variable sFx corresponding to the x-axis translation load Fx can be calculated using the following equations (4) and (5), respectively (see a calculation block B4 of FIG. 15).

$$sFz = z_i - Mx \times kx \qquad (4)$$

$$sFx = x_i - Mz \times kz \qquad (5)$$

Figure 16:
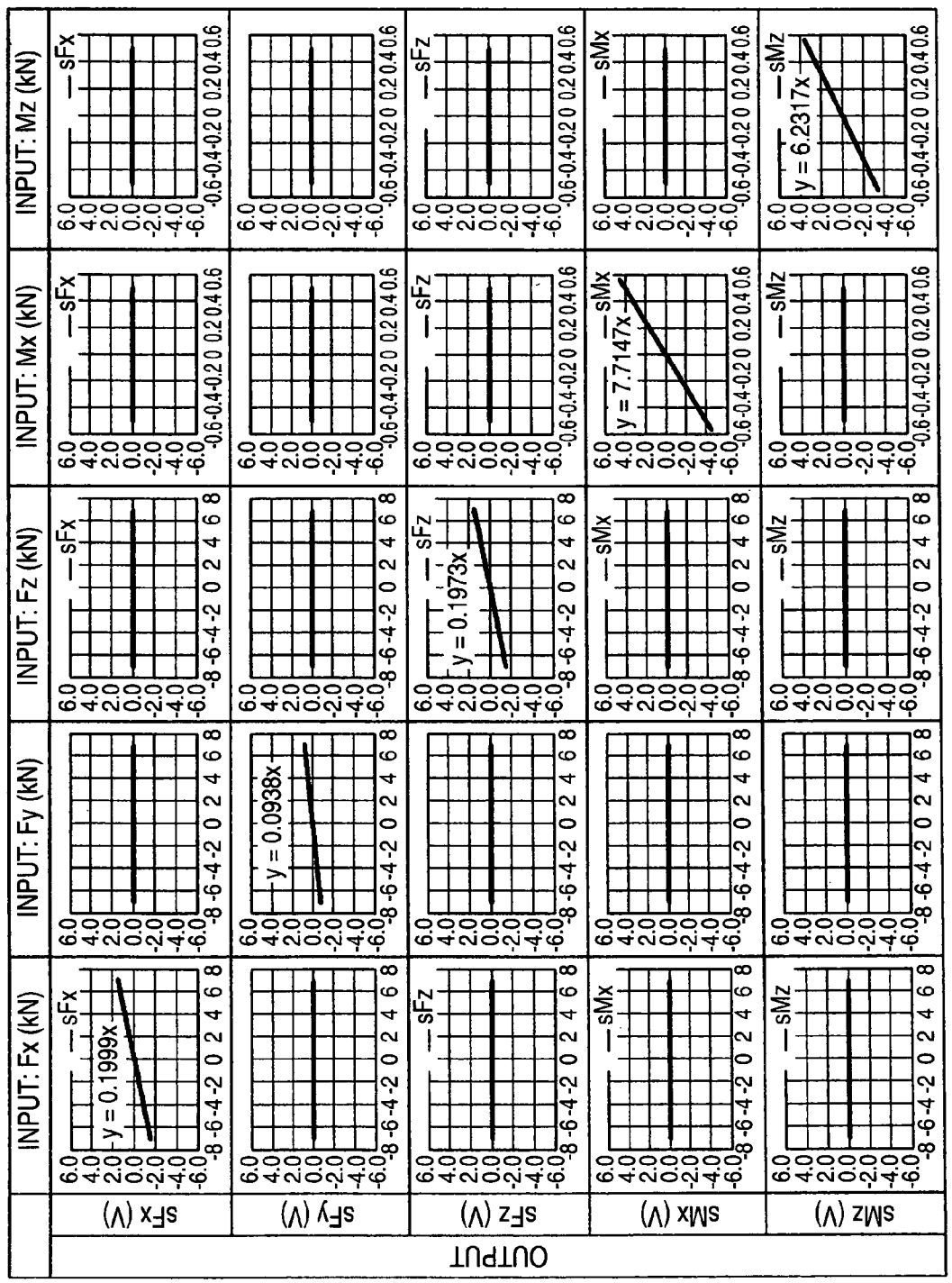
FIG. 16 is a matrix diagram showing a corresponding relationship between an independent variable calculated from a sensor output and an actual load applied to the wheel.

FIG. 16 shows matrix charts each showing a correlation between each independent variable sFx, sFy, sFz, sMx, sMz calculated using each of the above equation (1) to (5) and each load Fx, Fy, Fz, Mx, Mz actually applied to the wheel.

Specifically, each linear relation between each of the inputs of the loads Fx, Fy, Fz, Mx and Mz actually applied to the wheel and each of the output of the independent variables sFx, sFy, sFz, sMx and sMz given by the equations (1) to (5) is graphically shown in the form of matrix.

Therefore, if these independent variables sFx, sFy, sFz, sMx and sMz are determined, the individual loads Fx, Fy, Fz, Mx and Mz can be determined by solving first-degree simultaneous equations with five unknowns of the five loads Fx, Fy, Fz, Mx and Mz applied to the wheel.

In this embodiment, the aforesaid control unit 37, such as the ECU, incorporates therein an arithmetic circuit (hardware) and a control program (software) for solving the aforementioned equations (1) to (5) and the first-degree simultaneous equations with five unknowns. Therefore, the individual loads Fx, Fy, Fz, Mx and Hz actually applied to the wheel can be determined based on the eight detection values $f_i$, $r_i$, $t_i$, $b_i$, $f_o$, $r_o$, $t_o$, $b_o$ obtained by the individual sensors.

Figure 3:
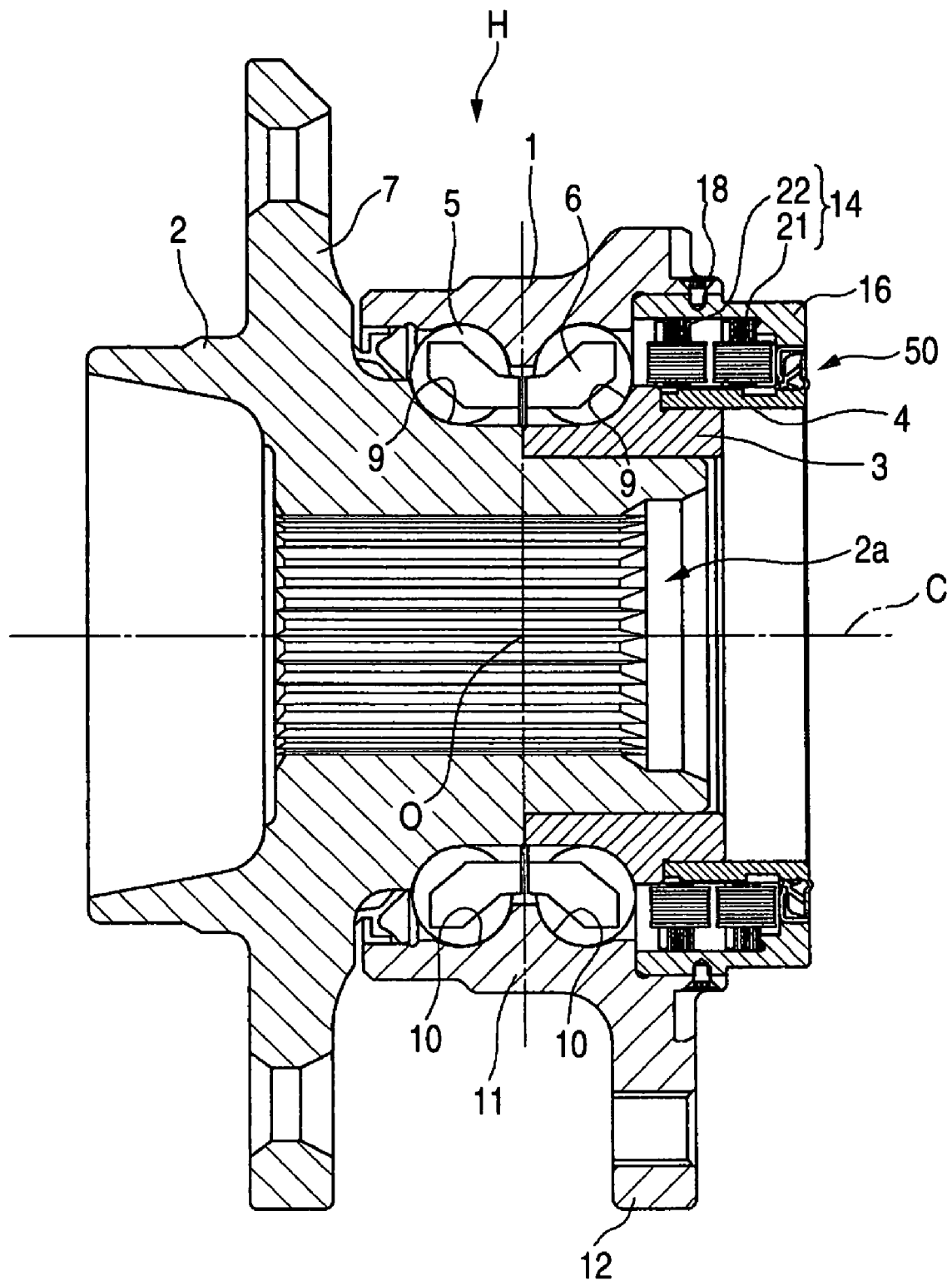
FIG. 3 is an explanatory view of a section in an axial direction of other embodiment of a bearing assembly according to the first aspect of the invention.
Figure 4:
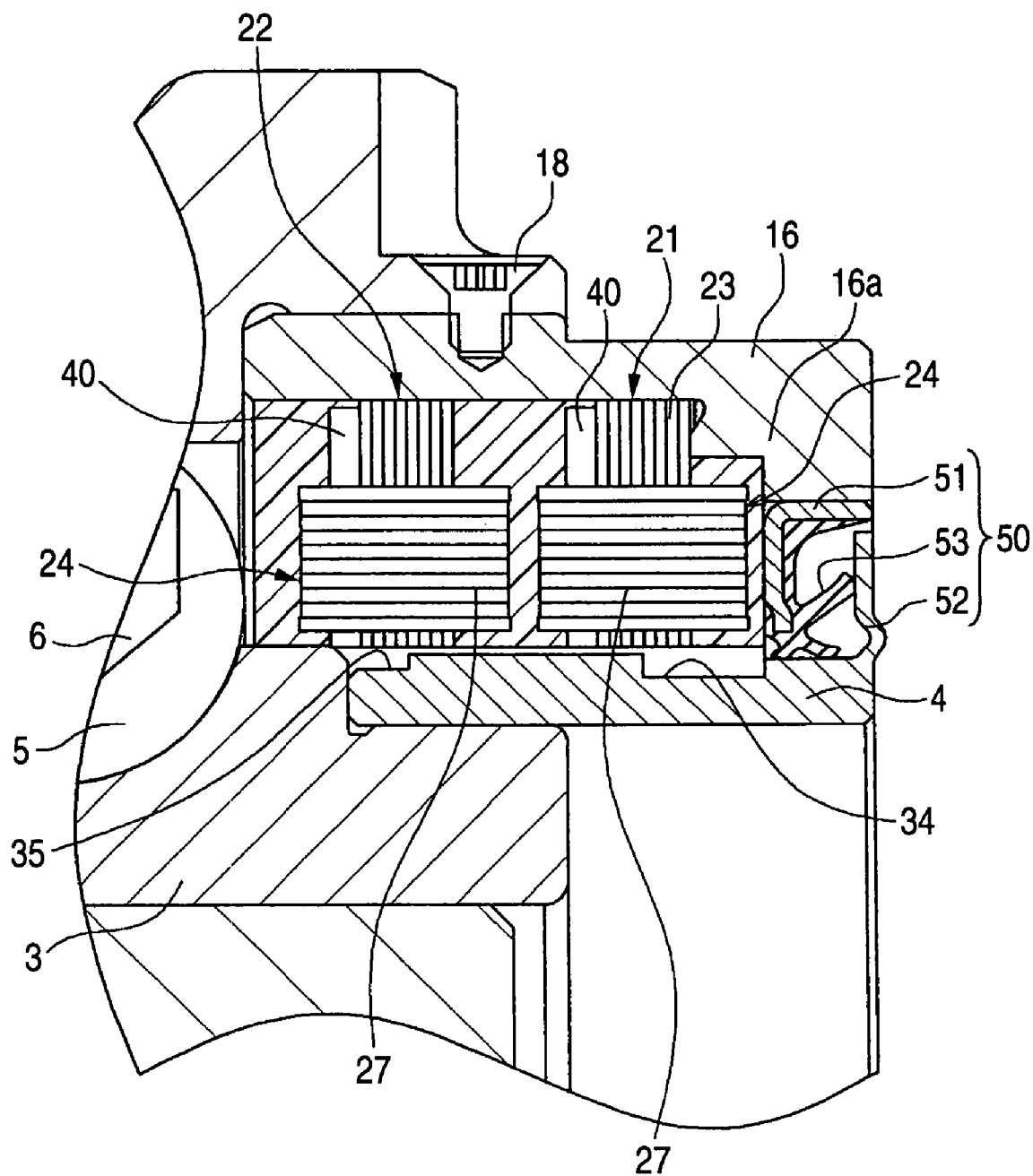
FIG. 4 is a view enlarging a portion of the bearing assembly shown in FIG. 3.

FIG. 3 is an explanatory view of an axial section of a bearing assembly according to other embodiment of the first aspect of the invention, and FIG. 4 is a view enlarging a portion of the apparatus shown in FIG. 3. The embodiment as shown by FIG. 4 is different from the embodiment shown in FIGS. 1 through 2 in that the seal metal core 52 on a side of the sensor target 4 of the pack seal 50 is formed integrally with the sensor target 4. Therefore, in FIGS. 3 and 4, elements or structures common to those of the embodiment shown in FIGS. 1 through 2 are attached with the same references and an explanation thereof will be omitted for simplicity.

According to the embodiment, the seal metal core 52 is formed by pressing one end portion of the sensor target 4. In the structure that the gap is detected by the displacement sensor 24 using the sensor target 4 provided at the inboard side end portion of the rotary bearing ring, the structure can be simplified by reducing a number of parts.

Further, the bearing assembly according to the first aspect is applicable not only to the drive wheel as shown by FIGS. 1 through 4 but also to a driven wheel. Further, according to the invention, the inner side seal device is not limited to the above-described pack seal but other seal mechanism can pertinently be adopted so far as the other seal mechanism has the structure capable of preventing a foreign matter from invading the sensor apparatus. For example, a single seal, a seal attached with a magnetizing pulsar, an ABS sensor including pack seal or the like can pertinently be adopted. Further, an outer diameter surface of the inner ring member (refer to FIG. 19 mentioned later) or a CVJ outer diameter surface can directly act as a detected surface without using other sensor target 4, in this case, an inner side seal device is inserted and arranged between the sensor housing 16 and the outer diameter surface of the inner ring member.

[Bearing Assembly According to Second Aspect]

Figure 5:
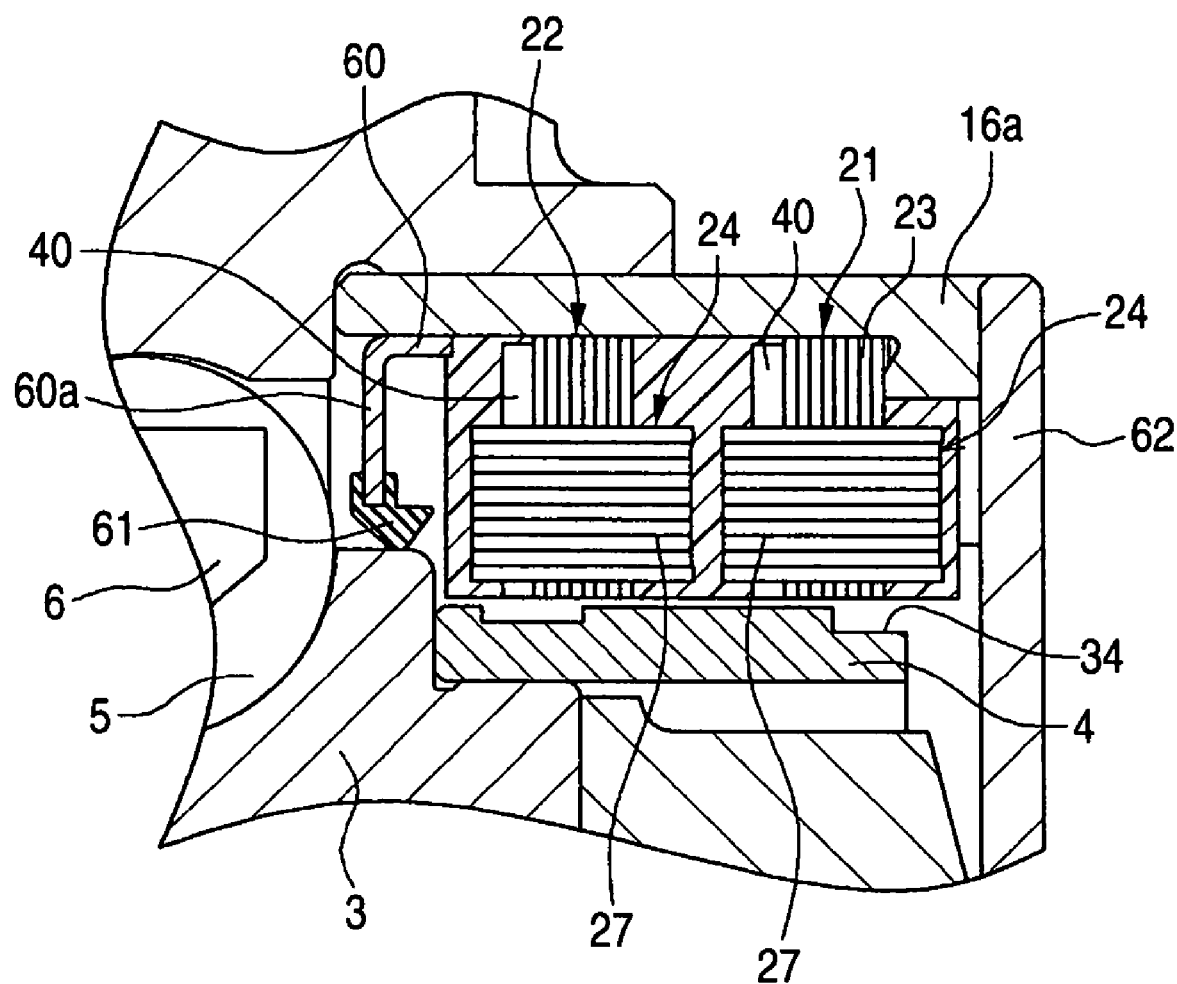
FIG. 5 is an explanatory view of a section of a portion of an embodiment of a bearing assembly according to a second aspect of the invention.
Figure 6:
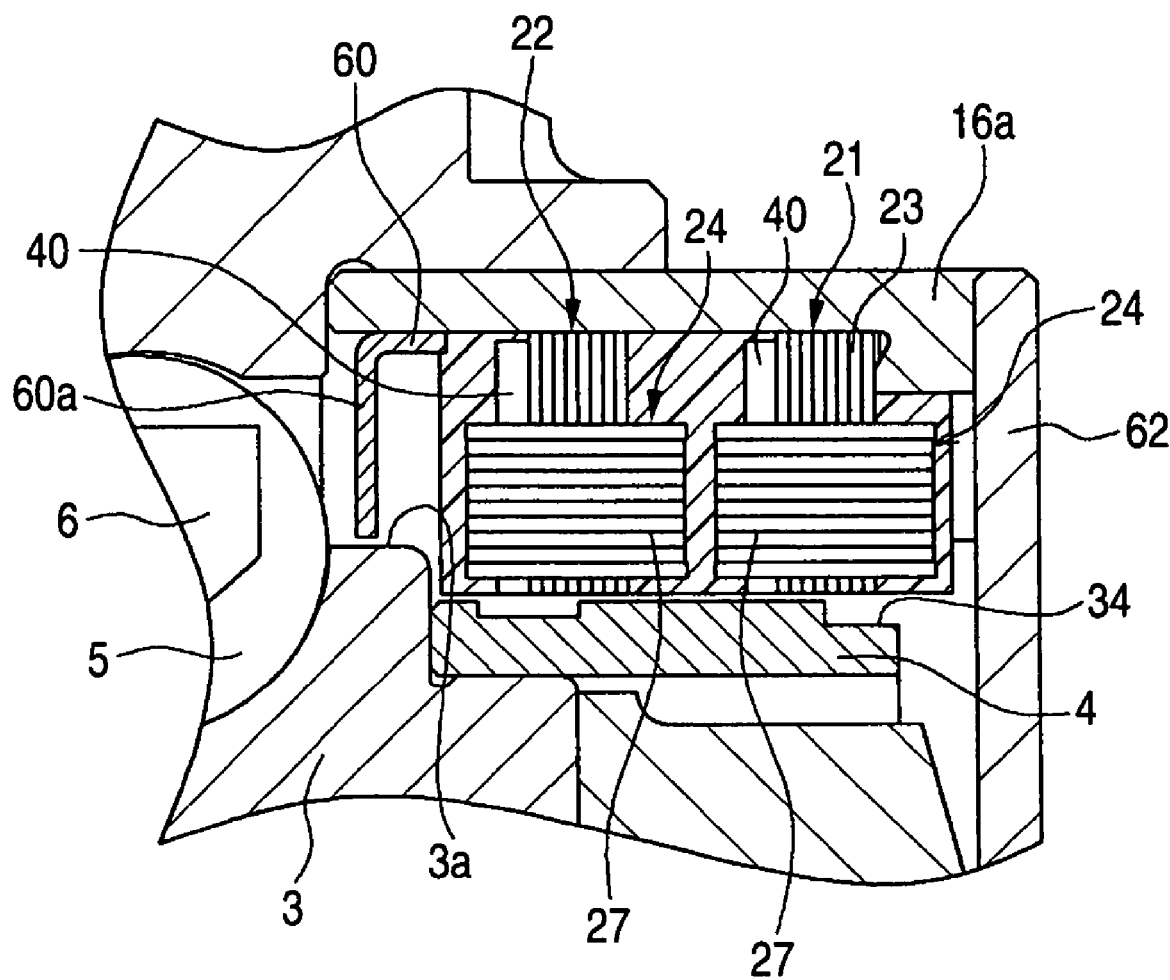
FIG. 6 is an explanatory view of a section of a portion of other embodiment of a bearing assembly according to the second aspect of the invention.

FIG. 5 is an explanatory view of a section of a portion of a bearing assembly for a driven wheel according to one embodiment of a second aspect of the invention, and FIG. 6 is an explanatory view of a section of a portion of other embodiment of the same. Further, in FIGS. 5 through 6, elements or structures common to those of the embodiment shown in FIGS. 1 through 2 mentioned above are attached with the same references and an explanation thereof will be omitted for simplicity.

According to the bearing assembly shown by FIGS. 1 through 4, and the bearing assembly according to the first or the second proposal of the applicant, a seal or the like is not arranged at a vicinity of the rolling elements on the inboard side. Inside of the bearing is constituted by the sealing structure to prevent a foreign matter of dirt, water or the like from outside from invading. In the bearing assembly shown by FIGS. 1 through 4, a pack seal (inner side seal device) is provided for the sealing structure. In the first or the second proposal, the lid member is provided in the bearing assembly for the sealing structure. However, there is not a seal or the like at a vicinity of the rolling elements on the inboard side but a space is formed, and therefore, it is conceivable that grease filled at inside of the bearing flows out to the sensor side and the bearing is damaged by a failure in lubrication.

Hence, according to the bearing assembly according to the second aspect of the invention, an outboard side end portion of the sensor housing 16 is sealed by an outboard side seal device to prevent the grease from flowing out. According to the embodiment shown in FIG. 5, the outboard side seal device is constituted by a slinger 60 having a section substantially in an L-like shape fixedly provided to an inner peripheral surface of a vicinity of the outboard side end portion of the sensor housing 16, and a seal member 61 made of rubber fixedly attached to a front end of a portion 60a of the slinger 60 extended to an inner side in a diameter direction. By providing the seal device, the grease filled at inside of the bearing can be prevented from flowing out to the sensor side, as a result, service life of the bearing can be prolonged by avoiding the bearing from being damaged by a failure in lubrication.

Further, an opening end of the sensor housing 16 is closed by a lid member 62 to thereby prevent a foreign matter of dirt, water or the like from outside from invading inside of the bearing.

FIG. 6 shows other embodiment of a bearing assembly according to the second aspect of the invention, according to the embodiment, a length of the portion 60a of the slinger 60 extended to the inner side in the diameter direction is made to be longer than that of the embodiment shown by FIG. 5, and the seal member 61 at the front end is omitted by making the front end opposed to an outer peripheral surface 3a of the inner ring member 3 by leaving a small clearance therebetween. According to the embodiment, the clearance between the slinger front end and the outer peripheral surface 3a of the inner ring member 3 is made to be very small, and therefore, the grease filled at inside of the bearing can be prevented from flowing out to the sensor side, as a result, service life of the bearing can be prolonged by avoiding the bearing from being damaged by a failure in lubrication.

Further, according to the invention, the outboard side seal device is not limited to the above-described but other seal mechanism can pertinently be adopted so far as the other seal mechanisms has a structure capable of preventing the grease from flowing out to the sensor apparatus. Further, the slinger 60 may integrally be formed with the sensor housing 16 similar to the seal metal core in FIG. 4, thereby the structure can be simplified by reducing a number of parts. Further, the slinger 60 can be attached to a side of the inner ring member 3 instead of the side of the sensor housing 16.

Figure 18:
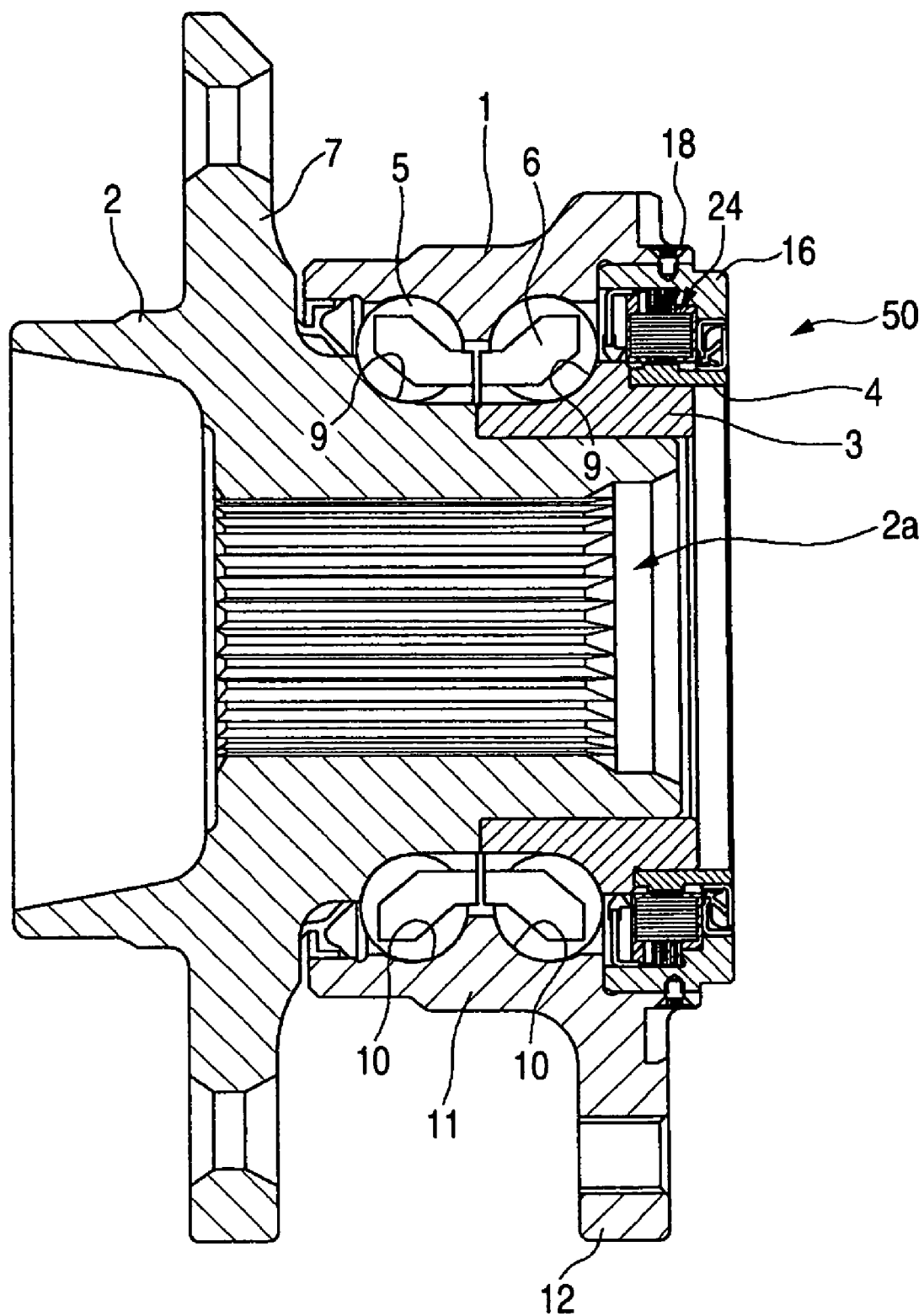
FIG. 18 is an explanatory view of a section in an axial direction of still other embodiment of a bearing assembly according to the first aspect of the invention.

The bearing assembly of the invention is not limited to the above-described embodiment but various modes can be constituted therefor. For example, FIG. 18 shows still other embodiment of a bearing assembly according to the first aspect of the invention, and a single row of the displacement sensors 24 can also be adopted as in the above-described first proposal in place of the plural rows of the displacement sensors 24. Further, the outboard side end portion of the sensor housing 16 can be sealed also by the outboard side seal device according to the second aspect of the invention.

Figure 19:
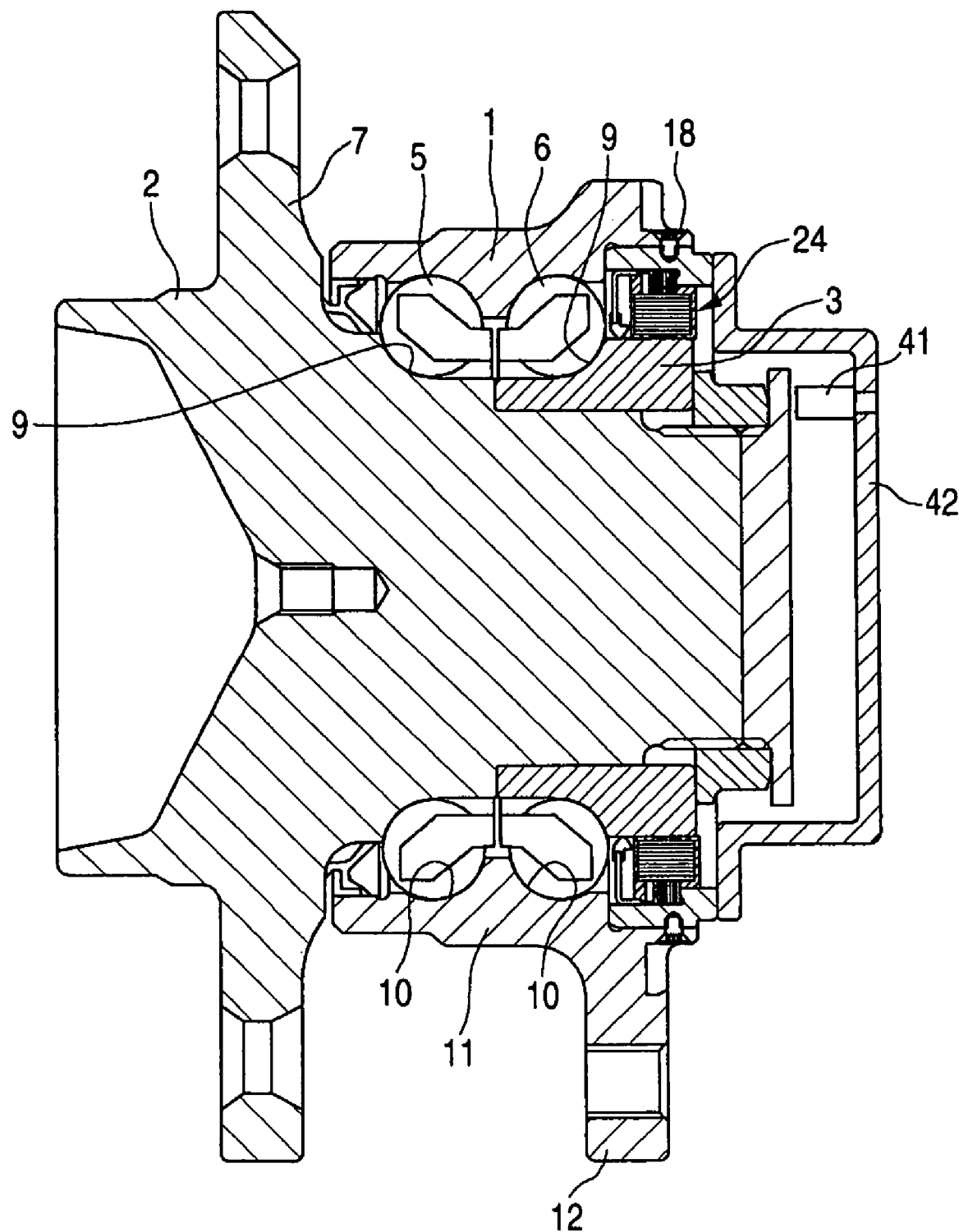
FIG. 19 is an explanatory view of a section in an axial direction of still other embodiment of a bearing assembly according to the second aspect of the invention.

FIG. 19 shows still other embodiment of a bearing assembly according to the second aspect of the invention, according to the embodiment, the displacement sensors 24 are constituted by a single row, and the inboard side end portion of the bearing assembly is closed by a lid member 42 having an axial displacement sensor 41 for detecting a gap between the axial displacement sensor 41 and an axial end surface of the inboard side end portion of the rotary bearing ring. Further, according to the embodiment shown by FIG. 19, the displacement sensors 24 are constituted by the single row, and an axial length of the portion detected by the displacement sensor 24 needs not to be so long. Therefore, the sensor target 4 is omitted, and the displacement sensor 24 is constituted to detect the gap between the displacement sensor 24 and the outer peripheral surface of the inner ring member 3. Further, also in the embodiment shown in FIG. 18, the displacement sensor 24 can be constituted to detect the gap between the displacement sensor 24 and the outer peripheral surface of the inner ring member 3 while the sensor target is omitted.

Next, an explanation will be given of a method of calculating respective loads in the bearing assembly having a single row of the displacement sensors 24 and the axial direction sensor 41 as in the embodiment shown in FIG. 19.

Assume that the displacement sensors 24 are provided at four portions in the circumferential direction (to upper and lower portions and to front and rear portions), on the other hand, the axial displacement sensors 41 are provided at two portions in the vertical direction.

In the bearing assembly arranged with the sensors as described, by relating an applied load (tire force) and a displacement of the rotary bearing ring to each other in advance, the load can be calculated. That is, with the displacement sensors, respective direction components (Fsx, Fsy, Fsz, Msx, Msz) of the load applied to the rotary bearing ring with regard to x axis, y axis, z axis can be calculated, The front and rear displacement sensors, the upper and lower displacement sensors, and the upper and lower axial displacement sensors are connected to an operational processing portion (not illustrated). The operational processing portion can be constituted by a controlling unit (ECU) mounted to the vehicle body side, and output values of the respective displacement sensors can be processed to calculate.

Figure 20:
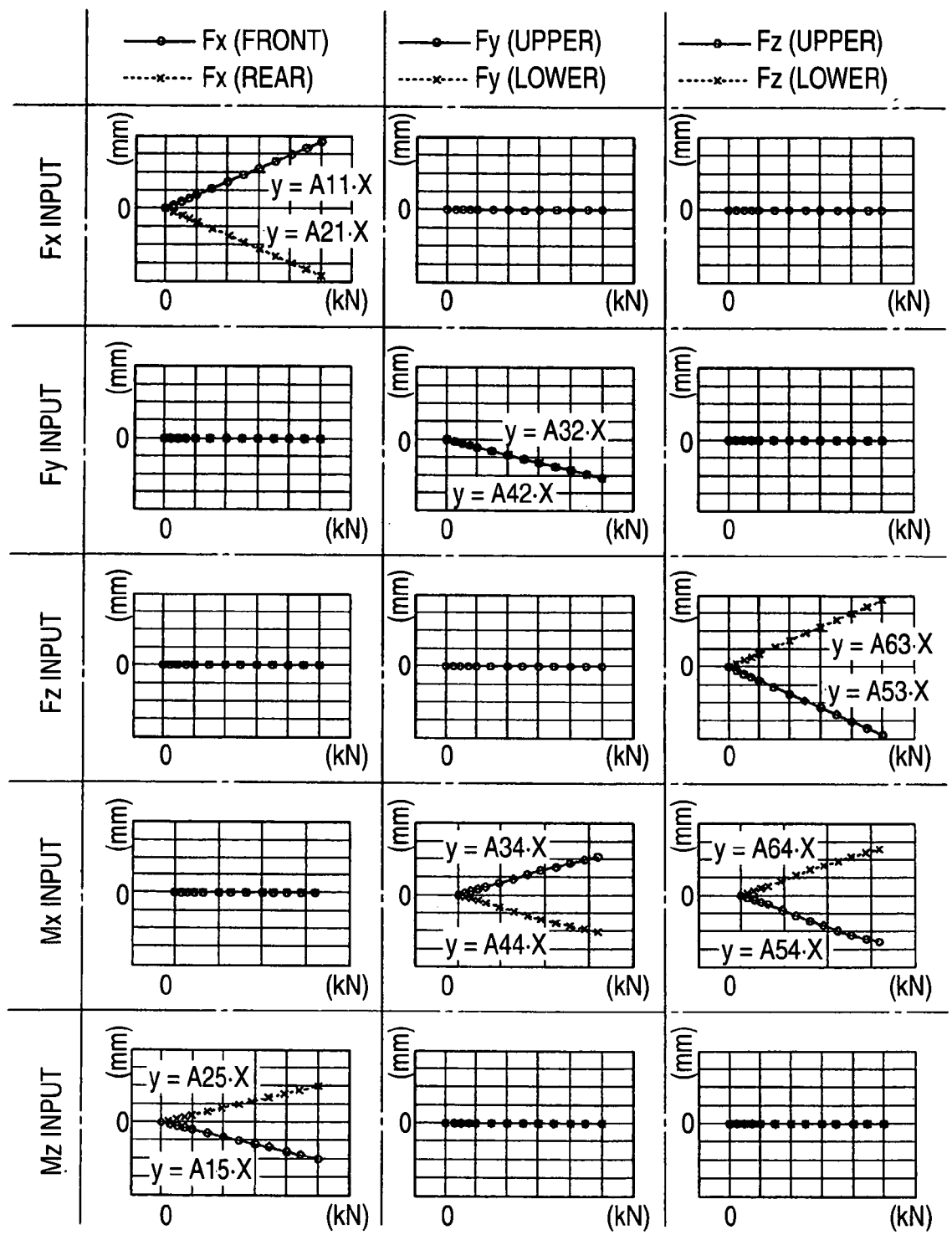
FIG. 20 illustrates graphs showing a displacement of a rotary bearing ring calculated from output values of respective displacement sensors when a force and a moment are applied to a wheel attached to a rotary bearing ring.

FIG. 20 shows a displacement of a rotary bearing ring calculated from the output values of the respective displacement sensors when a force and a moment are applied to a wheel attached to the rotary bearing ring. That is, FIG. 20 graphically shows respective displacements of the rotary bearing ring calculated based on the detection values (gaps) of the front and rear displacement sensors, the upper and lower axial displacement sensors and the upper and lower displacement sensors when a load in the x axis direction (Fx input), a load in the y axis direction (Fy input), a load in the z axis direction (Fz input) are applied as loads to the wheel, and a moment around x axis (Mx input), a moment around z axis (Mz input) are respectively applied as moments to the wheel.

Further, a general equation showing (rearranging) FIG. 20 as a determinant is equation (6), and a matrix M of the determinant calculated by a result of FIG. 20 is expressed by equation 2. That is, equation (6) and equation (7) express a relationship between the respective displacement sensors and the loads and the moments in respective directions by the determinant. Further, equation (8) calculates an inverse matrix $M^{-1}$ of the matrix M, and by calculating equation (9) based on values provided by the respective displacement sensors and the inverse matrix $M^{-1}$, components in the respective axial directions (Fsx, Fsy, Fsz, Msx, Msz) acting on the wheel (rotary bearing ring) can be calculated by a calculation.

$$\begin{bmatrix} Fx(\text{front}) \\ Fx(\text{rear}) \\ Fy(\text{top}) \\ Fy(\text{bottom}) \\ Fz(\text{top}) \\ Fz(\text{bottom}) \end{bmatrix} = M \cdot \begin{bmatrix} Fx \\ Fy \\ Fz \\ Mx \\ Mz \end{bmatrix} \quad (6)$$

where, $$M = \begin{bmatrix} m11 & m12 & m13 & m14 & m15 \\ m21 & m22 & m23 & m24 & m25 \\ m31 & m32 & m33 & m34 & m35 \\ m41 & m42 & m43 & m44 & m45 \\ m51 & m52 & m53 & m54 & m55 \\ m61 & m62 & m63 & m64 & m65 \end{bmatrix}$$

$$M = \begin{bmatrix} A_{11} & 0 & 0 & 0 & -A_{15} \\ -A_{21} & 0 & 0 & 0 & A_{25} \\ 0 & -A_{32} & 0 & A_{34} & 0 \\ 0 & -A_{42} & 0 & -A_{44} & 0 \\ 0 & 0 & -A_{53} & -A_{54} & 0 \\ 0 & 0 & A_{63} & A_{64} & 0 \end{bmatrix} \quad (7)$$

$$M^{-1} = \begin{bmatrix} B_{11} & -B_{11} & 0 & 0 & 0 & 0 \\ 0 & 0 & -B_{23} & -B_{24} & 0 & 0 \\ 0 & 0 & -B_{33} & -B_{34} & -B_{35} & -B_{36} \\ 0 & 0 & B_{43} & B_{44} & 0 & 0 \\ -B_{51} & B_{52} & 0 & 0 & 0 & 0 \end{bmatrix} \quad (8)$$

$$\begin{bmatrix} Fsx \\ Fsy \\ Fsz \\ Msx \\ Msz \end{bmatrix} = \begin{bmatrix} B_{11} & -B_{11} & 0 & 0 & 0 & 0 \\ 0 & 0 & -B_{23} & -B_{24} & 0 & 0 \\ 0 & 0 & -B_{33} & -B_{34} & -B_{35} & -B_{36} \\ 0 & 0 & B_{43} & B_{44} & 0 & 0 \\ -B_{51} & B_{52} & 0 & 0 & 0 & 0 \end{bmatrix} \begin{bmatrix} Fx(\text{front}) \\ Fx(\text{rear}) \\ Fy(\text{top}) \\ Fy(\text{bottom}) \\ Fz(\text{top}) \\ Fz(\text{bottom}) \end{bmatrix} \quad (9)$$

According to the respective displacement sensors and the operational processing portion mentioned above, the components (Fsx, Fsy, Fsz, Msx, Msz) in the respective axial directions of the load (tire force) applied to the wheel (rotary bearing ring) can be calculated by calculating output values of the respective displacement sensors and a previously stored predetermined function (inverse matrix $M^{-1}$). Further, by symmetrically arranging the displacement sensors 24 on upper and lower sides and front and rear sides with respect to the center line C, it is not necessary to carry out a temperature correction by calculating differences among the respective output values.

What is claimed is:

1. A rolling bearing assembly for a wheel comprising:
a cylindrical fixed bearing ring fixed to a vehicle body side;
a rotary bearing ring rotatably inserted into the fixed bearing ring;
plural rows of rolling elements rollably arranged between the fixed bearing ring and the rotary bearing ring;
an annular sensor housing attached to an inboard side end portion of the fixed bearing ring, wherein the annular sensor housing includes a plurality of displacement sensors that detect gaps between the plurality of displacement sensors and an outer peripheral surface of an inboard side end portion of the rotating bearing ring, the plurality of displacement sensors being arranged in a circumferential direction thereof;
an inboard side seal device that seals an inboard side end portion of the sensor housing; and
an outboard side seal device that seals an outboard side end portion of the sensor housing,
wherein the outer peripheral surface of the inboard side end portion of the rotary bearing ring is provided with an annular sensor target,
wherein the plurality of displacement sensors detect gaps between the plurality of displacement sensors and an outer peripheral surface of the sensor target, and
wherein the sensor target and a seal metal core of the inboard side seal device are integrally formed.

2. A rolling bearing assembly for a vehicle comprising:
a cylindrical fixed bearing ring fixed to a vehicle body side;
a rotary bearing ring rotatably inserted into the fixed bearing ring;
plural rows of rolling elements rollably arranged between the fixed bearing ring and the rotary bearing ring; and
an annular sensor housing attached to an inboard side end portion of the fixed bearing ring, wherein the annular sensor housing includes a plurality of displacement sensors that detect gaps between the plurality of displacement sensors and an outer peripheral surface of an inboard side end portion of the rotating bearing ring, the plurality of displacement sensors being arranged in a circumferential direction thereof,
wherein the plurality of displacement sensors are covered by a synthetic resin or a rubber species material to be integrated with the sensor housing, and
wherein the plurality of displacement sensors comprise first and second displacement sensors for respectively detecting the gaps at positions of peripheral side surfaces of the rotary bearing ring remote from each other in an axial direction.

3. The rolling bearing assembly according to claim 2, further comprising an inboard side seal device that seals an inboard side end portion of the sensor housing.

4. The rolling bearing assembly according to claim 2 further comprising an outboard side seal device that seals an outboard side end portion of the sensor housing.

* * * * *